United States Patent
McCord et al.

(10) Patent No.: US 12,281,957 B2
(45) Date of Patent: Apr. 22, 2025

(54) METHODOLOGY AND APPLICATION OF ACOUSTIC DETECTION OF OPTICAL INTEGRITY

(71) Applicant: Apple Inc., Cupertino, CA (US)

(72) Inventors: Michael K. McCord, San Francisco, CA (US); Ehsan Khajeh, Los Gatos, CA (US); Brian M. King, Saratoga, CA (US); Tong Chen, Fremont, CA (US); Yaser Shanjani, Fremont, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 17/664,832

(22) Filed: May 24, 2022

(65) Prior Publication Data

US 2022/0397483 A1 Dec. 15, 2022

Related U.S. Application Data

(60) Provisional application No. 63/209,935, filed on Jun. 11, 2021.

(51) Int. Cl.
 G01M 11/02 (2006.01)
 G02B 3/00 (2006.01)
(52) U.S. Cl.
 CPC ....... *G01M 11/0278* (2013.01); *G02B 3/0006* (2013.01)
(58) Field of Classification Search
 CPC .................................................. G01M 11/0278
 See application file for complete search history.

(56) References Cited

U.S. PATENT DOCUMENTS 10,510,226 B2  12/2019  Siglock
2005/0134805 A1  6/2005  Conner et al.
(Continued)

FOREIGN PATENT DOCUMENTS

CN   1769887 A   5/2006
CN  108445021 A   8/2018
(Continued)

OTHER PUBLICATIONS

Extended European Search Report received for European Patent Application No. 22177825.1, mailed on Oct. 18, 2022, 7 pages.
(Continued)

*Primary Examiner* — Walter L Lindsay, Jr.
*Assistant Examiner* — Andrew V Do
(74) *Attorney, Agent, or Firm* — Kubota & Basol LLP

(57) ABSTRACT

Acoustic optical integrity detection system architectures and methods can be used to detect optical integrity of an optical component by detecting a discontinuity on and/or in the optical component (e.g., on the optical surface and/or within the bulk of the optical component). In some examples, integrity detection can be used to ensure safety compliance of an optical system, optionally including a laser. Acoustic integrity detection can utilize transducers (e.g., piezoelectric transducers) to transmit ultrasonic waves along an optical surface and/or through the thickness of an optical component. A discontinuity of the optical surface can interact with the transmitted wave causing attenuation, redirection and/or reflection of at least a portion of the transmitted wave. Portions of the transmitted wave energy after interaction with the discontinuity can be measured to determine discontinuity location, type, and/or severity.

20 Claims, 16 Drawing Sheets

(56) References Cited

U.S. PATENT DOCUMENTS

2018/0180890 A1\* 6/2018 Baerenrodt ............ G02F 1/0018
2018/0373913 A1 12/2018 Panchawagh et al.
2020/0348267 A1\* 11/2020 Thomson ............. G01N 29/265

FOREIGN PATENT DOCUMENTS

| | | | |
|---|---|---|---|
| CN | 108932084 | A | 12/2018 |
| CN | 109154959 | A | 1/2019 |
| CN | 110325891 | A | 10/2019 |
| EP | 1519362 | A | 3/2005 |
| EP | 1519362 | A2 | 3/2005 |
| JP | 2020502567 | A | 1/2020 |
| JP | 2020537174 | A | 12/2020 |
| KR | 20190095384 | A | 8/2019 |
| WO | 2018/119276 | A1 | 6/2018 |
| WO | 2018/210317 | A1 | 11/2018 |

OTHER PUBLICATIONS

Search Report received for Chinese Patent Application No. 202210655190.5, mailed on Sep. 30, 2024, 3 pages (1 Pages of English Translation and 2 Pages of Official Copy).

\* cited by examiner

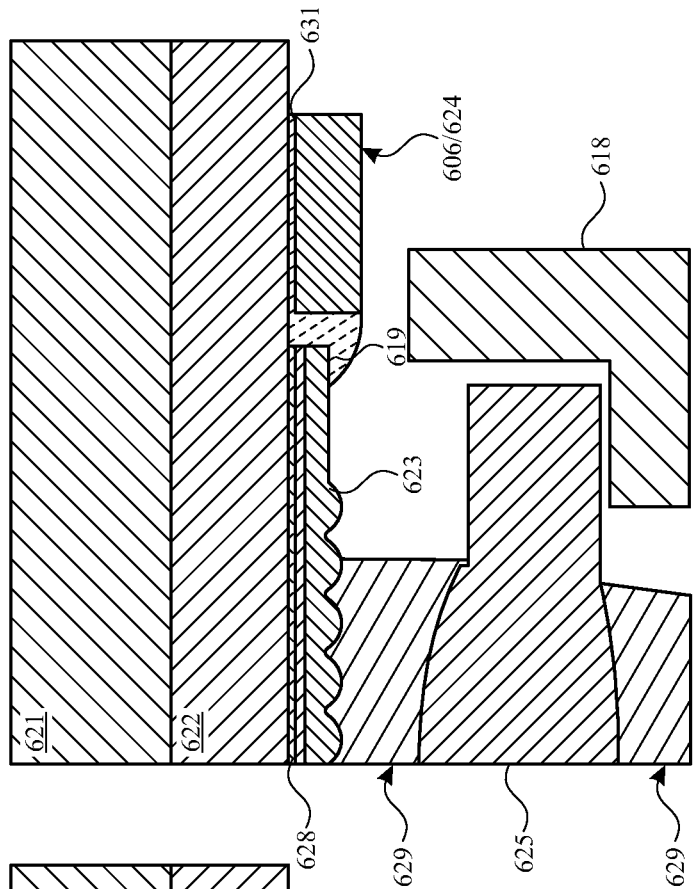
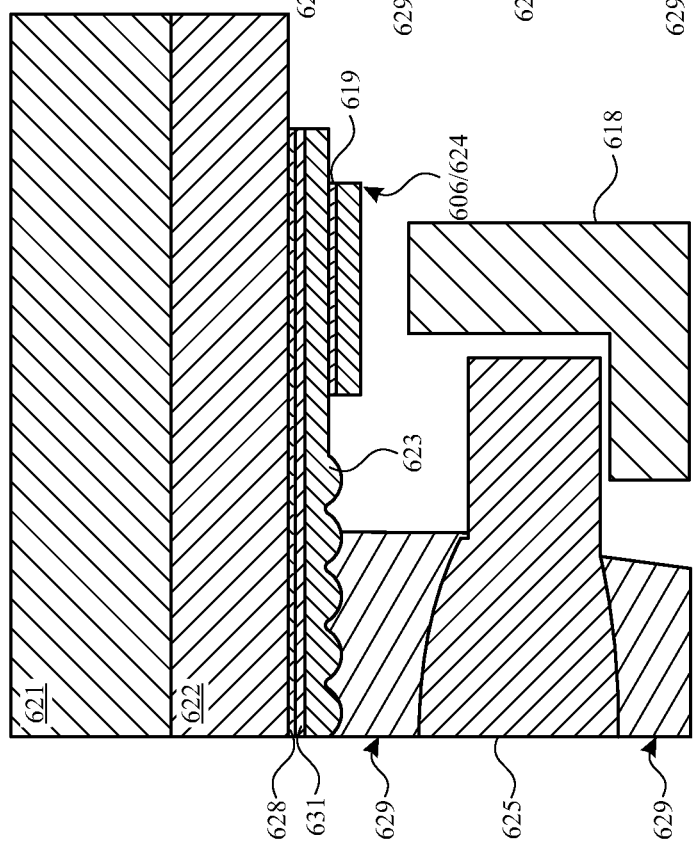

METHODOLOGY AND APPLICATION OF ACOUSTIC DETECTION OF OPTICAL INTEGRITY

CROSS-REFERENCE TO RELATED APPLICATIONS

This application claims the benefit of U.S. Provisional Application No. 63/209,935, filed Jun. 11, 2021, the content of which is incorporated herein by reference in its entirety for all purposes.

FIELD OF THE DISCLOSURE

This relates generally to detection of optical integrity, and more particularly, to various methodologies and applications of acoustic detection of optical integrity

BACKGROUND OF THE DISCLOSURE

Geometric optical components are presently available for performing optical operations in a computing system. Geometric optical components ("refractive optical components," "geometric optics," "refractive optics"), such as lenses, micro lenses, lens arrays, and the like, can bend incident light and shape a beam of light using non-normal (e.g., greater than or less than ninety degrees) interfaces between materials of different refractive index. One or more contoured surfaces can provide the computing system with near field and far field optical performance, including compliance (e.g., light/laser eye safety compliance, light/laser skin safety compliance, etc.). In comparison with flat optics (e.g., diffractive optics, meta-surfaces, etc.), geometric optics are becoming increasingly popular in consumer electronics because of their low cost, high efficiency, and high performance, to name a few benefits. To guarantee (i.e., substantially guarantee) compliance and performance, the optical integrity of geometric optics in an illumination system of a computing system, including exterior shape/form, internal refractive index, lamination and installation, fluid submersion status, etc., must be monitored during active illumination usage (e.g., emitting light through the geometric optics). However, traditional integrity detection methods, such as the use of resistive or capacitive safety traces, cannot be reliably applied to the contoured surfaces (e.g., a convex surface) of geometric optics, due to limitations of lithograph patterning on multidimensional surfaces with curved/sharp transitions, and due to the thermal expansion of traditional lens array materials (e.g., glass and epoxy). Additionally, for example, direct and indirect optical/imaging detection of the lens array may not be fully effective/compliant upon all usage (e.g., due to imaging resolution), and/or may induce significant additional system cost.

SUMMARY

This relates to system architectures, apparatus and methods for acoustic integrity detection (integrity evaluation) and exemplary applications of the system architectures, apparatus and methods. Position of an impurity or discontinuity touching or integral to an optical surface can be determined using time-of-flight (TOF) techniques, or attenuation of reflections from an array of barriers, for example. Acoustic integrity detection can utilize one or more transducers, such as piezoelectric transducers, to transmit ultrasonic waves along an optical surface and/or through the thickness of an optical component of an electronic device. As the wave propagates along the optical surface, one or more impurities or discontinuities (e.g., scratches, liquid ingress, etc.) in contact with or integral to the optical surface can interact with the transmitted wave causing attenuation, redirection and/or reflection of at least a portion of the transmitted wave. In some examples, portions of the transmitted wave energy after interaction with the one or more impurities or discontinuities can be measured to determine the existence(s) and/or location(s) of the one or more impurities or discontinuities on/in the optical surface of the optical component. For example, one or more transducers (e.g., acoustic transducers) coupled to an optical system (e.g., lens array) including one or more optical components (e.g., lenses) of a device can be configured to transmit an acoustic wave along an optical surface of each lens and/or through the thickness of the lens array and can receive a portion of the wave reflected back when the acoustic wave encounters a scratch or water droplet in or touching the optical surface. The location of the impurity or discontinuity can be determined, for example, based on the amount of time elapsing between the transmission of the wave and the detection of the reflected wave. Acoustic integrity detection can be used instead of, or in conjunction with, other integrity detection techniques, such as the application of resistive and/or capacitive safety traces. In some examples, the acoustic integrity detection techniques described herein can be used on a contoured surface of a lens in a lens array of a device, which may be unsuitable for capacitive or resistive safety traces due to the three-dimensional shape of the lens surface. In some examples, the acoustic touch sensing techniques described herein can be used on a surface of a display coupled to the lens array. In some examples, an acoustic integrity detection system can be configured to control operability of one or more light emitters of an illumination system, such that light emission is disabled when an impurity or discontinuity is detected in one or more lenses of the lens array.

BRIEF DESCRIPTION OF THE DRAWINGS

FIGS. 6A-6B illustrate exemplary configurations for mounting one or more acoustic transducers to a lens array in a material stack up of an electronic device according to examples of the disclosure.

DETAILED DESCRIPTION

Figure 1A:
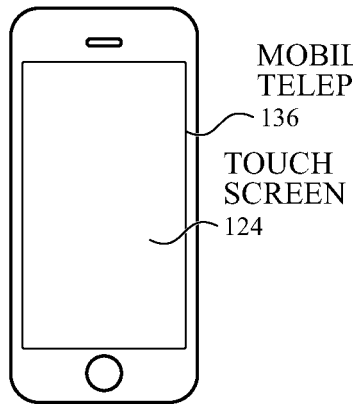
FIGS. 1A-1E illustrate exemplary electronic devices that can include an acoustic optical integrity detection system according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to system architectures, apparatus and methods for acoustic integrity detection (e.g., optical integrity detection) and exemplary applications of the system architectures, apparatus and methods. Optical integrity of a surface (e.g., curved or contoured surface) of an optical component (e.g., a lens) of an optical system (e.g., a micro lens array) can be evaluated using attenuation of reflections from an array of barriers, for example. Acoustic integrity detection can utilize one or more transducers, such as piezoelectric transducers, to transmit ultrasonic waves along an optical surface and/or through the thickness of an electronic device. As the wave propagates along the optical surface, one or more impurities (e.g., crack, scratch, water ingress, etc.) present in or in contact with the optical surface can interact with the transmitted wave causing attenuation, redirection and/or reflection of at least a portion of the transmitted wave. Portions of the transmitted wave energy after interaction with the one or more impurities can be measured to determine the optical integrity of the optical surface of an optical component within the device. For example, one or more transducers (e.g., acoustic transducers) coupled to an optical surface of an optical component in a device can be configured to transmit an acoustic wave along the optical surface and/or through the thickness of the optical component and can receive a portion of the wave reflected back when the acoustic wave encounters an impurity on and/or in the optical surface. The presence of the impurity can be determined, for example, based on the evaluation (i.e., measurement) of one or more characteristics of the transmitted wave and the reflected wave, such as differences in amplitude or period. For example, the one or more characteristics of the reflected wave may be compared to a baseline acoustic response captured by the transducer (e.g., in the factory during an optical test confirming optical safety compliance of known-good optics). In some examples, the location of the impurity can be determined, for example, based, in part, on the amount of time elapsing between the transmission of the wave and the detection of the reflected wave (e.g., using a time-of-flight technique). Acoustic integrity detection can be used instead of, or in conjunction with, other integrity detection techniques, such as the application of resistive and/or capacitive safety traces. In some examples, the acoustic integrity detection techniques described herein can be used on a contoured surface of an optical component, which may be unsuitable for capacitive or resistive touch sensing due to limitations of lithograph patterning on three-dimensional surfaces with sharp transitions. In some examples, the acoustic integrity detection techniques described herein can be used on a glass or epoxy surface of a lens array. In some examples, an acoustic integrity detection system can be configured to control light emission from one or more light emitters of an illumination system in the device.

Figure 1B:
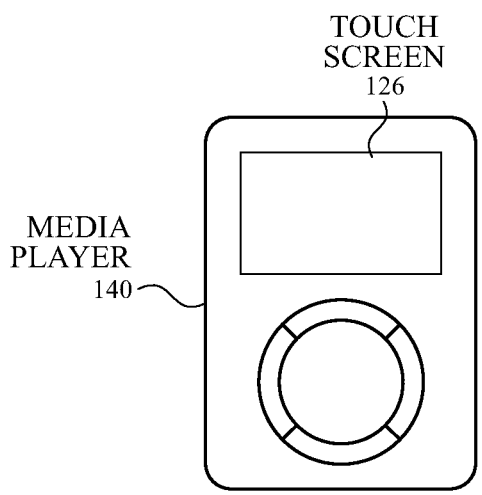
Figure 1C:
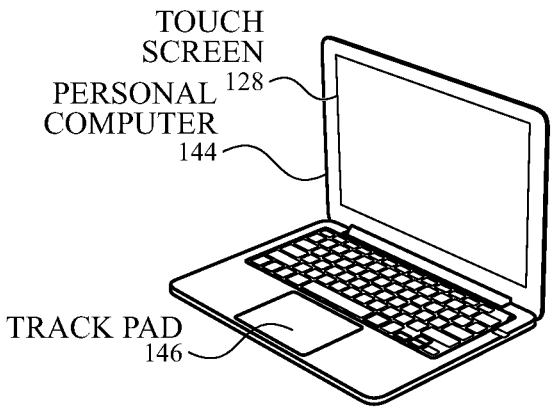
Figure 1D:
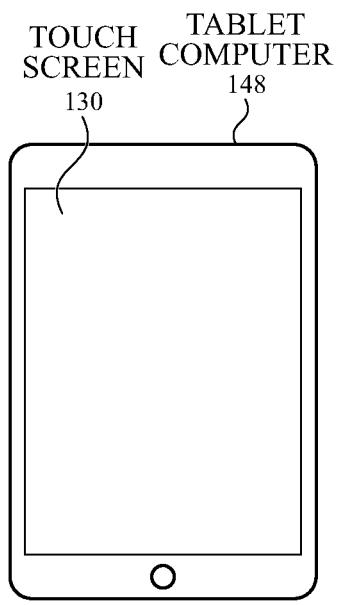
Figure 1E:
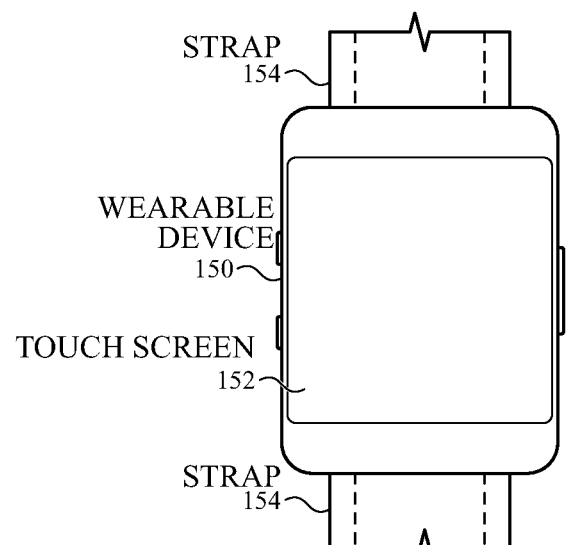

FIGS. 1A-1E illustrate examples of systems with touch screens and optical components that can include acoustic sensors for detecting impurities in and/or on an optical surface of an optical component of the system. FIG. 1A illustrates an exemplary mobile telephone 136 that includes a touch screen 124 and can include an acoustic optical integrity detection system ("acoustic optical integrity detection system," "acoustic integrity detection system," "acoustic integrity evaluation system") according to examples of the disclosure. FIG. 1B illustrates an example digital media player 140 that includes a touch screen 126 and can include an acoustic integrity detection system according to examples of the disclosure. FIG. 1C illustrates an example personal computer 144 that includes a touch screen 128 and a track pad 146, and can include an acoustic integrity detection system according to examples of the disclosure. FIG. 1D illustrates an example tablet computing device 148 that includes a touch screen 130 and can include an acoustic integrity detection system according to examples of the disclosure. FIG. 1E illustrates an example wearable device 150 (e.g., a watch) that includes a touch screen 152 and can include an acoustic integrity detection system according to examples of the disclosure. Wearable device 150 can be coupled to a user via strap 154 or any other suitable fastener. It should be understood that the example devices illustrated in FIGS. 1A-1E are provided by way of example, and other types of devices can include an acoustic integrity detection system for detecting the presence of an impurity on and/or in an optical surface of an optical component of the device. Additionally, although the devices illustrated in FIGS. 1A-1E include touch screens, in some examples, the devices may have a non-touch-sensitive display.

Acoustic sensors can be incorporated in the above-described systems to add acoustic integrity detection capabilities to an optical surface of an optical component (e.g., a lens) of the system. For example, acoustic sensors can allow the optical surfaces of one or more lenses in a lens array to be evaluated for impurities during the manufacturing stage (e.g., before final packaging of the device including the lens array). In some examples, the above-described systems may comprise illumination systems including one or more light emitters, which can be lasers, light-emitting diodes, vertical-cavity surface-emitting lasers (VSCELs), and the like. Accordingly, for example, acoustic sensors can allow the optical integrity of optical components of an optical system of the device to be evaluated prior to actuation of the one or more emitters, such that to ensure a sufficient amount of optical integrity conducive to effective light emission from the one or more emitters. As another example, in some examples, an optical surface of an optical component can be augmented with acoustic sensors to provide an optical integrity detection capability for use in detecting water ingress in wet environments or under conditions where the device may get wet (e.g., exercise, swimming, rain, washing hands, etc.).

Figure 2:
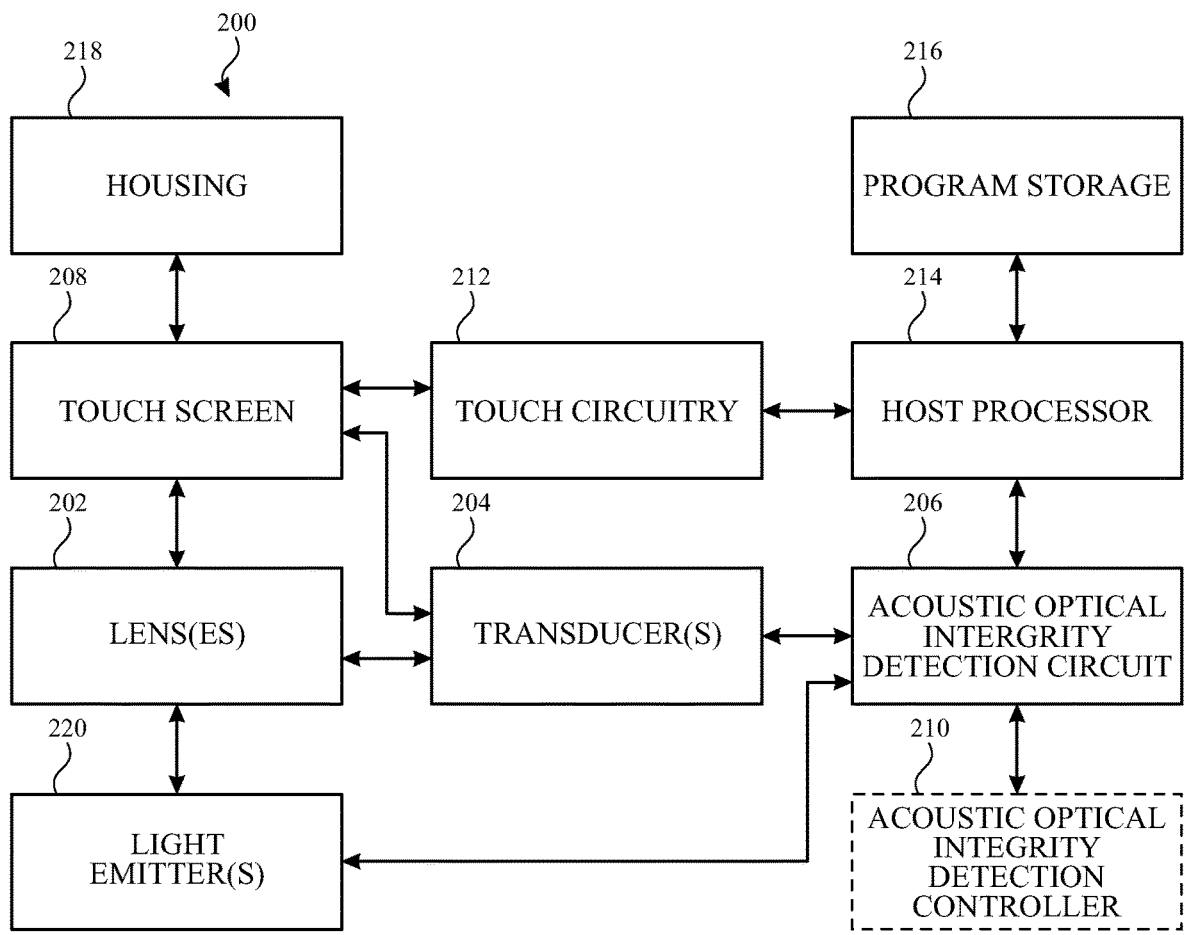
FIG. 2 illustrates an exemplary block diagram of an electronic device including an optical integrity detection system according to examples of the disclosure.

FIG. 2 illustrates an exemplary block diagram of an electronic device including an acoustic optical integrity system according to examples of the disclosure. In some examples, lenses (within a lens array) 202 (i.e., the optical components of the optical system described above) of device 200 (which can correspond to devices 136, 140, 144, 148, and 150 above) can be coupled with one or more acoustic transducers 204. In some examples, transducers 204 can be piezoelectric transducers, which can be made to vibrate by the application of electrical signals when acting as a transmitter, and generate electrical signals based on detected vibrations when acting as a receiver. In some examples, the transducers 204 can be formed from a transparent piezoelectric ceramic material (e.g., ZnO or AlN) or a transparent piezoelectric polymer material (e.g., PVDF). Similarly, transducers 204 can produce electrical energy as an output when vibrated. In some examples, the transducers 204 can be bonded to the lenses 202 by a bonding agent (e.g., a thin layer of stiff epoxy). In some examples, the transducers 204 can be disposed on the optical surface through processes such as deposition, lithography, or the like. In some examples, the transducers 204 can be bonded to the surface using conductive or non-conductive bonding materials. When electrical energy is applied to the transducers 204 it can cause the transducers to vibrate, the surface material in contact with the transducers can also be caused to vibrate, and the vibrations of the molecules of the surface material can propagate as an acoustic wave through the surface material. In some examples, vibration of the transducers 204 can be used to produce ultrasonic acoustic waves at a selected frequency over a broad frequency range (e.g., 20 kHz-800 kHz, 20 kHz-1 MHz, or other suitable frequency ranges) in the medium of the optical surface of the lenses 202, which can be glass, plastic (e.g., epoxy), or the like. It should be understood that other frequencies outside of the exemplary range above can be used while remaining within the scope of the present disclosure.

In some examples, lenses 202 (e.g., within a lens array) can also be partially or completely optically coupled to one or more light emitters 220 (e.g., lasers). In some examples, the light emitters 220 are configured to emit light, wherein the light may propagate through the lenses 202, through the transducers 204, and through the touch screen 208. In some examples, transducers 204 can also be partially or completely disposed on (or coupled to) a portion of a touch screen 208, which can be coupled/integral to housing 218. For example, the touch screen 208 (e.g., capacitive) may comprise a glass panel (cover glass), and a display region of the touch screen may be surrounded by a non-display region (e.g., a black border region surrounding the periphery of the display region of touch screen). In some examples, transducers 204 can be disposed partially or completely in the black mask region of the touch screen 208 glass panel (e.g., on the back side of the glass panel behind the black mask), such that the transducers are not visible (or are only partially visible) to a user. In some examples, transducers 204 can be coupled partially or completely to the display region of the touch screen 208, such that the transducers 204 are coupled between the touch screen 208 and the lenses 202. In such examples, the transducers 204 may be constructed of transparent or partially transparent materials (e.g., ZnO, AlN) to allow all or substantial portions of light to pass through the display region, for example.

Device 200 can further comprise acoustic optical integrity detection circuitry 206, which can include circuitry for driving electrical signals to stimulate vibration of the transducers 204 (e.g., transmit circuitry), as well as circuitry for sensing electrical signals output by the transducers (e.g., receive circuitry) when the transducer is stimulated by received acoustic energy. In some examples, timing operations for the acoustic integrity detection circuitry 206 can optionally be provided by a separate acoustic optical integrity detection controller 210 that can control timing of acoustic integrity detection circuitry 206 operations. In some examples, integrity detection controller 210 can be coupled between acoustic integrity detection circuitry 206 and host processor 214. In some examples, controller functions can be integrated with the acoustic integrity detection circuitry 206 (e.g., on a single integrated circuit). Output data from acoustic integrity detection circuitry 206 can be output to a host processor 214 for further processing to determine a location, type, and/or severity of an impurity on and/or in the lenses 202 or the display (e.g., touch screen 208) of the device, as will be described in more detail below. In some examples, the processing for determining location, type, and/or severity of a surface impurity can be performed by the acoustic integrity detection circuitry 206, controller 210 or a separate sub-processor of device 200 (not shown). In some examples, the acoustic detection circuitry 206, controller 210, or separate sub-processor (not shown) can control light emission (from light emitters 220) using the determination of a presence of a surface impurity (i.e., based on the determining the location, type, and/or severity).

In addition to acoustic integrity detection circuitry 206, the device can include additional touch circuitry 212 and optionally a touch controller (not shown) that can be coupled to the touch screen 208. In some examples that include a touch controller, the touch controller can be disposed between the touch circuitry 212 and the host processor 214. The touch circuitry 212 can, for example, be capacitive or resistive touch sensing circuitry, and can be used to detect contact and/or hovering of objects (e.g., fingers, styli, etc.) in contact with and/or in proximity to the touch screen 208, particularly in the display region of the touch screen. Thus, device 200 can include multiple types of detection circuitry (e.g., touch circuitry 212 and acoustic integrity detection circuitry 206) for detecting objects (and their positions) in different regions of the device while detecting impurities of the optical components (lenses 202) within the device, as will be described in more detail below. Although described herein as including a touch screen, it should be understood that touch circuitry 212 can be omitted and touch screen 208 can be replaced by an otherwise non-touch-sensitive display.

Host processor 214 can receive acoustic or other touch outputs (e.g., capacitive) and perform actions based on the touch outputs. Host processor 214 can also be connected to program storage 216 and touch screen 208. Host processor 214 can, for example, communicate with touch screen 208 to generate an image on touch screen 208, such as an image of a user interface (UI), and can use touch sensing circuitry 212 to detect a touch on or near touch screen 208, such as a touch input to the displayed UI. The touch input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing, such as operation of acoustic integrity detection circuitry 206 (and, in some examples, acoustic integrity detection controller 210) to detect an impurity on or near the lenses 202, such as a scratch or water ingress and/or operation of light emitters 220.

Note that one or more of the functions described herein can be performed by firmware stored in memory and executed by the touch circuitry 212 and/or acoustic integrity detection circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3A:
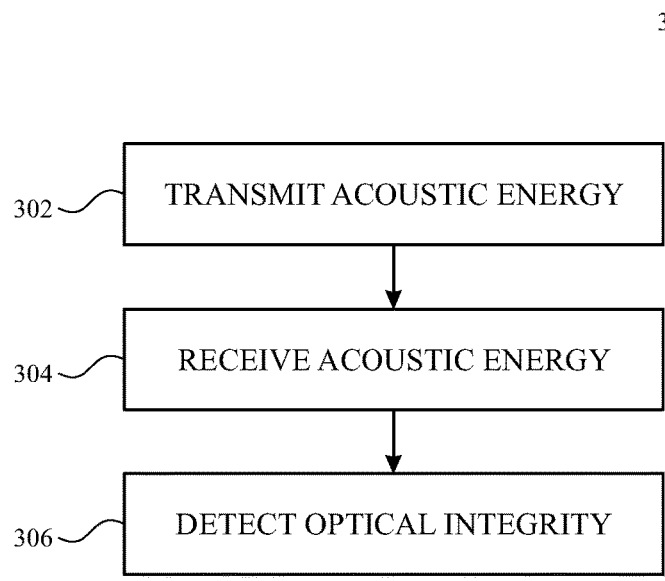
FIG. 3A illustrates an exemplary method for acoustic detection of the optical integrity of an optical system according to examples of the disclosure.

FIG. 3A illustrates an exemplary method 300 for acoustic detection of the optical integrity of an optical system according to examples of the disclosure. At 302, acoustic energy can be transmitted (e.g., by one or more transducers 204) along or through an optical surface of an optical component of a device in the form of an ultrasonic wave, for example. In some examples, the wave can propagate as a compressive wave, a shear horizontal wave, a Rayleigh wave, a Lamb wave, a Love wave, a Stonely wave, or a surface acoustic wave. Other propagation modes for the transmitted acoustic energy can also exist based on the properties of the surface material and the manner of energy transmission from the transducers to the optical surface of the optical component. In some examples, the optical surface can be formed from glass or epoxy (e.g., lenses 202) or the surface can be formed from glass or sapphire crystal (e.g., touch screen 208). Transmitted energy can propagate along the surface until a discontinuity/impurity in the surface is reached, which can cause a portion of the energy to reflect. In some examples, a discontinuity or impurity can be an irregularity in the shape of the surface (e.g., a groove or pattern etched into the surface). In some examples, a discontinuity can be a reflective material coupled to the surface (e.g., disposed on the surface). In some examples, water in contact with the surface (e.g., water ingression) can also be a discontinuity. In some examples, a discontinuity can occur at edges (i.e., endpoints) of the surface material (e.g., when the ultrasonic wave propagates to the edge of the surface opposite the transducer). In some examples, delamination of the optical components of the optical system (e.g., the lens array) from the display (e.g., of a touch screen) can also be a discontinuity. When the transmitted energy reaches one of the discontinuities described above, some of the energy can be reflected, and a portion of the reflected energy can be directed to the one or more transducers 204.

At 304, returning acoustic energy can be received, and the acoustic energy can be converted to an electrical signal by one or more transducers 204. At 306, the acoustic sensing system can determine whether one or more impurities or discontinuities is present on and/or in the surface of the optical component, and can further detect the position, type, and/or severity of one or more impurities based on the received acoustic energy. In some examples, a distance of an impurity from the transmission source (e.g., transducers 204) can be determined from a time-of-flight between transmission and reception of reflected energy, and a propagation rate of the ultrasonic wave through the material. In some examples, baseline reflected energy (known from a fully functional and continuous optical surface (i.e., no abnormal/unexpected discontinuities or impurities)) can be compared to a measured value of reflected energy. The baseline reflected energy can be determined based on simulation of an ideal integrity curve for a particular optical surface and component, and/or based on a stored integrity curve (e.g., saved in memory) obtained during testing of a particular optical surface and component, as examples. Timing of measured deviations of the reflected energy from the baseline can be correlated with a location of the impurity. In some examples, amplitudes along a plurality of arcs of the transmitted and received waves can be recorded and processed to reconstruct an image of amplitude for each location. Although method 300, as described above, generally refers to reflected waves received by the transducers that transmitted the waves, in some examples, the transmitter and receiver functions can be separated such that the transmission of acoustic energy at 302 and receiving acoustic energy at 304 may not occur at the same transducer (e.g., one transducer configured to transmit and one transducer configured to receive). Exemplary device configurations and measurement timing examples that can be used to implement method 300 will be described in further detail below.

In some examples, the acoustic optical integrity detection can determine operability of one or more light emitters 220, such that the emission of light from the one or more light emitters 220 depends on the integrity of the optical component. For example, the acoustic optical integrity detection can include criteria for the received acoustic energy (e.g., indicative of optical integrity) that must be satisfied in order for light to be emitted from the one or more light emitters.

Figure 3B:
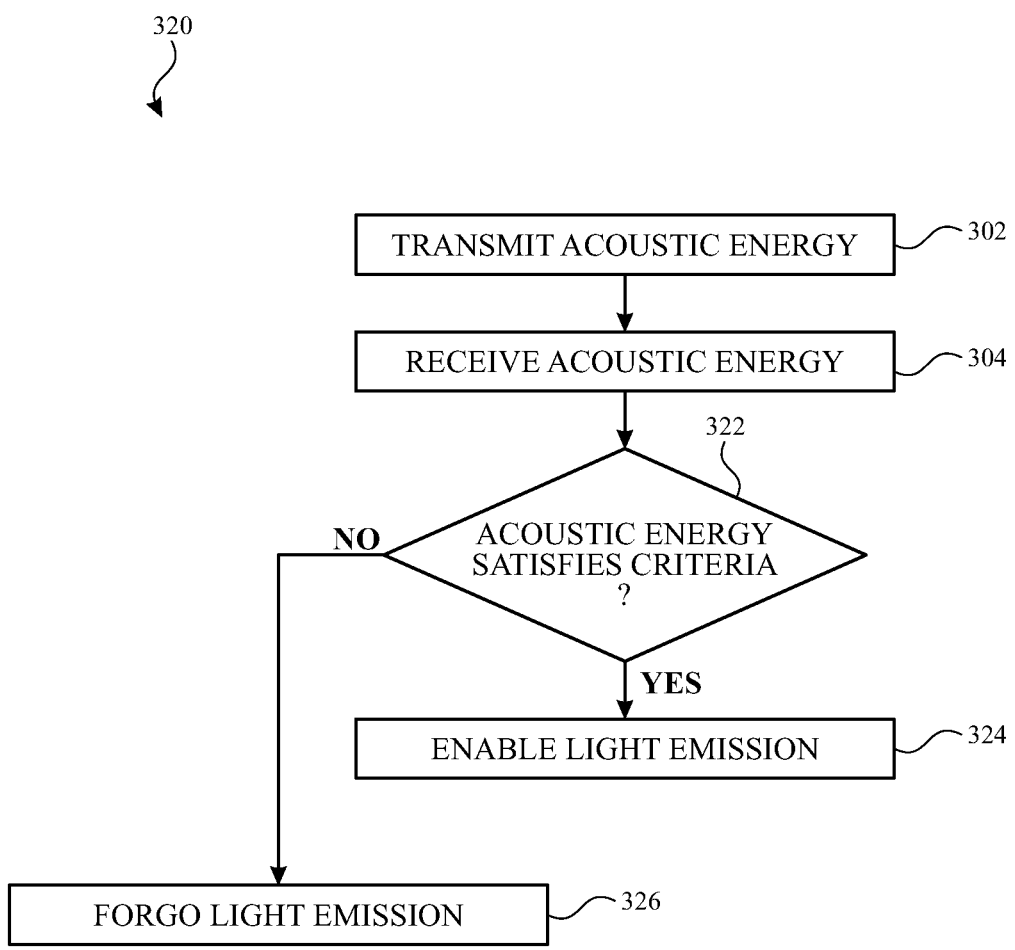
FIG. 3B illustrates an exemplary process for operating a light emitter based on the optical integrity of an optical system according to examples of the disclosure.

The one or more criteria can be referred to herein as optical integrity criteria or integrity criteria. FIG. 3B illustrates an exemplary process 320 for operating a light emitter based on the optical integrity of an optical system according to examples of the disclosure. Process 300 can include transmitting and receiving acoustic energy as in 302 and 304, as described above with respect to FIG. 3A. At 322, the acoustic optical integrity detection system can evaluate the optical integrity using the received acoustic energy and one or more integrity criteria. In some examples, the detected optical integrity can be expressed in terms of one or more characteristics of the reflected energy, such as quantitative values for amplitude, flight time, period, etc., as mentioned above. As described above, these quantitative values may allow the system to determine the position, type, and/or severity of the detected impurity, such that, for example, the optical component may be flagged and the detected impurity may be attended to (e.g., replaced, fixed, etc.). Additionally or alternatively, the detected optical integrity can, for the exemplary process 320 shown in FIG. 3B, be expressed simply in terms of whether or not an impurity was detected (e.g., positive or negative detection). As such, at 322, the optical integrity detection system may check whether unexpected discontinuities/impurities were detected, and to determine whether to enable light emission bases on the detection or non-detection of the unexpected discontinuities/impurities. It can be appreciated that this simplified evaluation step may enable the determination of whether to enable light emission to be performed faster (in comparison with the time taken to detect impurity location, type, and/or severity). As shown, if the one or more criteria are satisfied (i.e., no impurity is detected), then the light emitters 220 are enabled and allowed to emit light (324). Alternatively, if the one or more criteria are not satisfied (i.e., one or more impurities are detected), then the light emitters 220 are disabled and not allowed to emit light (326).

It should be understood that the exemplary processes 300 and 320 shown in FIGS. 3A-3B may be performed as many or as few times as desired or needed. For example, process 320 may be performed every time light is to be emitted from the one or more light emitters 220. Additionally or alternatively, in some examples, the integrity detection process 300 may be performed more than once (e.g., two or three times) to reduce occurrences of false positives (i.e., false detection of an impurity) and/or false negatives (i.e., false detection of no impurity).

Figure 4:
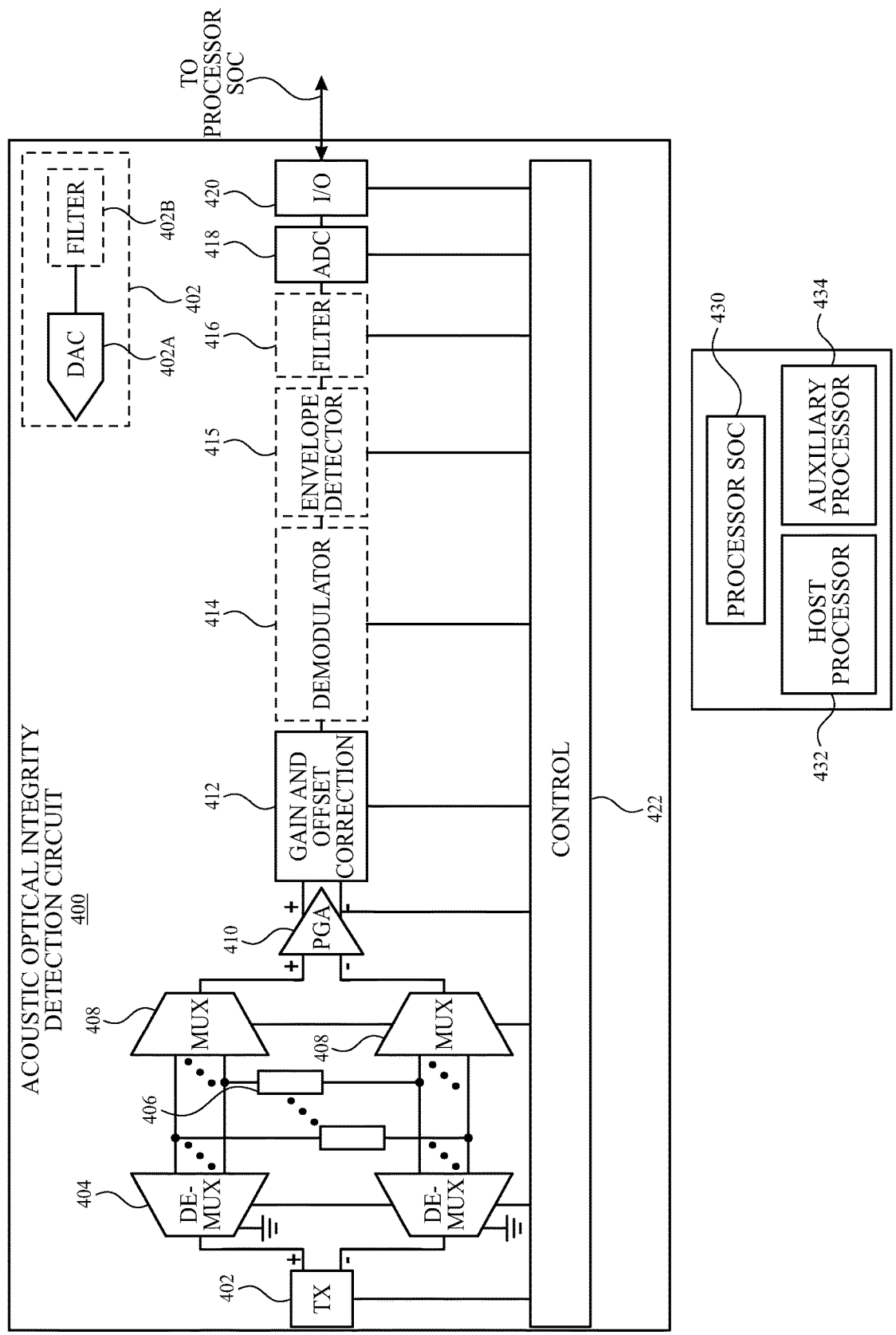
FIG. 4 illustrates an exemplary configuration of an acoustic optical integrity detection circuit according to examples of the disclosure.

FIG. 4 illustrates an exemplary configuration of an acoustic optical integrity detection circuit 400 according to examples of the disclosure. Acoustic integrity detection circuit 400 can include acoustic integrity detection circuitry 402-404 and 408-420 (which can correspond to acoustic integrity detection circuitry 206 above) and control logic 422 (which can correspond to acoustic integrity detection controller 210 above). In some examples, acoustic integrity detection circuit 400 can also optionally include transducers 406 (which can correspond to transducers 204 above). Although not shown in FIG. 4, in some examples, the acoustic optical integrity detection circuit 400 can also optionally include an optical system including optical components (which can correspond to lenses 202), light emitting circuitry (which can correspond to light emitters 220 and may include control circuitry for operating the light emitters based on optical integrity detection), In some examples, a transmitter 402 can generate an electrical signal for stimulating movement of one or more of a plurality of transducers 406. In some examples, the transmitted signal can be a differential signal, and in some examples, the transmitted signal can be a single-ended signal. In some examples, transmitter 402 can be a simple buffer, and the transmitted signal can be a pulse (or burst of pulses at a particular frequency). In some examples, transmitter 402 can include a digital-to-analog converter (DAC) 402A and an optional filter 402B that can be optionally used to smooth a quantized output of DAC 402A. In some examples, characteristics of the transducer itself can provide a filtering property and filter 402B can be omitted. DAC 402A can be used to generate an arbitrary transmit waveform. In some examples, the arbitrary waveform can pre-distort the transmit signal to equalize the channel. In some examples, the characteristics of each channel, such as the properties of the surface material coupled to transducers 406, the discontinuities in the surface material, and the reflection characteristics of an optical surface of an optical component of the device can be measured and stored. In some examples, the channel characteristics can be measured as a manufacturing step (or factory calibration step), and in other examples the characteristics can be measured as a periodic calibration step (i.e., once a month, once a year, etc. depending on how quickly the channel characteristics are expected to change). In some examples, the channel characteristics can be converted to a transfer function of the channel, and the arbitrary transmit waveform can be configured using the inverse of the channel transfer function such that the returning signal is equalized (e.g., returning signal can be detected as a pulse or a burst of pulses despite the transmitted waveform having a seemingly arbitrary waveform). In some examples, a single differential pulse can be used as a transmit waveform. For example, a bipolar square pulse (where the voltage applied to the transducer can be both positive and negative) can be used as the transmit waveform, and the bipolar square pulse can be implemented using a single-ended or differential implementation.

A pair of demultiplexers 404 (e.g., in a differential implementation) can be used to selectively couple transmitter 402 to one of transducers 406 that can be the active transducer for a particular measurement step in a measurement cycle. In some examples, demultiplexers 404 can have a ground connection, and the non-selected demultiplexer outputs can be shorted, open, or grounded. As described above, transducers 406 can also generate output electrical signals when motion is induced in the transducers by acoustic energy. A pair of multiplexers 408 (e.g., in a differential implementation) can be used to select a transducer 406 for coupling to a programmable gain amplifier 410 configured to amplify the received signals. In some examples, the same transducer 406 can be coupled to transmitter 402 by demultiplexers 404 during the drive mode and coupled to programmable gain amplifier 410 by multiplexers 408 during the receive mode. Thus, a single transducer 406 can be used both for transmitting and receiving acoustic energy. In some examples, a first transducer can be coupled to transmitter 402 by demultiplexers 404 and a second transducer can be coupled by multiplexers 408 to programmable gain amplifier 410. For example, the transmitting transducer and the receiving transducer can be discrete piezoelectric elements, where the transmitting transducer can be designed for being driven by higher voltages (or currents) to produce sufficient motion in transducer 406 to generate an acoustic wave in the surface of a device (e.g., device 200 above), and the receiving transducer can be designed for receiving smaller amplitude reflected energy. In such an architecture, the transmit side circuitry (e.g., 402 and 404) can be optionally implemented on a high voltage circuit, and the receive side circuitry (e.g., 408-420) can be optionally implemented on a separate low voltage circuit. In some examples, multiplexers 408 can also be implemented on the high voltage circuit to properly isolate the remaining receive side circuitry (e.g., 410-420) during transmission operations by transmit side circuitry. Additionally or alternatively, in some examples, the transmit circuit can include an energy recovery architecture that can be used to recover some of the energy required for charging and discharging the transducer. In some examples, the programmable gain amplifier output can be coupled to gain and offset correction circuit 412. It should be understood that for a single-ended implementation, a single demultiplexer 404 and a single multiplexer 408 can be used, and transmitter 402, programmable gain amplifier 410, and the input to gain and offset correction circuit 412 can be single-ended as well. Differential implementations, however, can provide improved noise suppression over a single-ended implementation.

In some examples, the acoustic touch sensing circuit can be used in a system including multiple transmit transducers and one receive transducer. In such examples, demultiplexer 404 can be unnecessary and omitted from the acoustic touch sensing circuit. In some examples, the acoustic touch sensing circuit can be used in a system including multiple receive transducers and one transmit transducer. In such examples, multiplexer 408 can be unnecessary and omitted from the acoustic touch sensing circuit.

In some examples, the output of gain and offset correction circuit 412 can optionally be coupled to one or more analog processing circuits. In some examples, the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at filter 416. In some examples, these blocks can be placed in a different order. In some examples, the processing of these analog processing circuits can be performed in the digital domain.

The received signals, whether raw or processed by one or more of demodulation circuit 414, envelope detection circuit 415 or filter 416 can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to a host processor of the device, or to an auxiliary processor (sub-processor) separate from the host processor. For example, as illustrated, the output of I/O circuit 420 can be coupled to a processor system-on-chip (SoC) 430, which can include one or more processors. In some examples, processor SoC 430 can include a host processor 432 (e.g., an active mode processor) and an auxiliary processor 434 (e.g., a low power processor). In some examples, some digital signal processing can be performed (e.g., by acoustic touch sensing circuit 400) before transmitting the data to other processors in the system (e.g., processor SoC 430). A control circuit 422 can be used to control timing and operations of the acoustic integrity detection circuitry 402-420. In some examples, the I/O circuit is not only used for data transfer to processor SoC 430 (e.g., host processor 432), but also is used for writing the control registers and/or firmware download from processor SoC 430.

As described herein, the light emitting circuitry may include a laser driver (not shown in FIG. 4), for example, configured to drive the one or more light emitters. In some examples, the light emitting circuitry can receive an interrupt signal or other control signal for preventing light emission from an optical system including a laser when an optical impurity is detected (e.g., to ensure safety compliance of an optical system including a laser). In some examples, control for enabling or disabling the light emitting circuitry may be performed by the processor SoC 430 using the output of I/O circuit 420 (and thus output of transducers 406). In some examples, the control may be provided by I/O circuit 420 directly without using processor SoC 430. As discussed herein, the light emitting circuitry may receive an indication (or a plurality of indications) that a discontinuity has been detected at, on, and/or near the lenses (e.g., corresponding to lenses 202) by one or more of the transducers 406 (e.g., by one or more reflections received by the one or more transducers 406). The control for the light emitting circuitry may produce an interrupt signal (e.g., a one bit message or flag, such as logic high) that is received by the laser driver driving the one or more light emitters, which may cause the one or more light emitters to forgo light emission (e.g., as shown by 326 in FIG. 3B). Additionally or alternatively, when no discontinuity has been detected by the one or more transducers 406 and upon receipt of a go ahead signal (e.g., a single bit message or flag, such as logic low), the light emitting circuitry may allow the laser driver/light emitters to emit light (e.g., as shown by 324 in FIG. 3B) in the absence of an interrupt signal.

It is to be understood that the configuration of FIG. 4 is not limited to the components and configuration of FIG. 4, but can include other or additional components in multiple configurations according to various examples. For example, although not explicitly shown for simplicity, the configuration of FIG. 4 may include light emitting circuitry which may include a laser driver, for example, configured to drive the one or more light emitters 220 and receive an interrupt signal for preventing light emission (e.g., when an optical impurity is detected), as discussed above. Additionally, some or all of the components 402-404 and 408-420 can be included in a single circuit, or can be divided among multiple circuits while remaining within the scope of the examples of the disclosure.

As described herein, various acoustic sensing techniques can be used to detect one or more impurities on, in, or near an optical surface of an optical component, and thereby to evaluate the optical integrity of the optical component of the optical system. In some examples, the optical system may be a micro lens array (MLA) having one or more lenses and may interact with an illumination system including one or more light emitters, as disclosed above. One or more acoustic transducers can be coupled to the MLA to evaluate the optical integrity of the one or more lenses, and to enable or disable the one or more light emitters based on the optical integrity (e.g., to operate as a fail-safe for the illumination system), as will be described below.

Figure 5A:
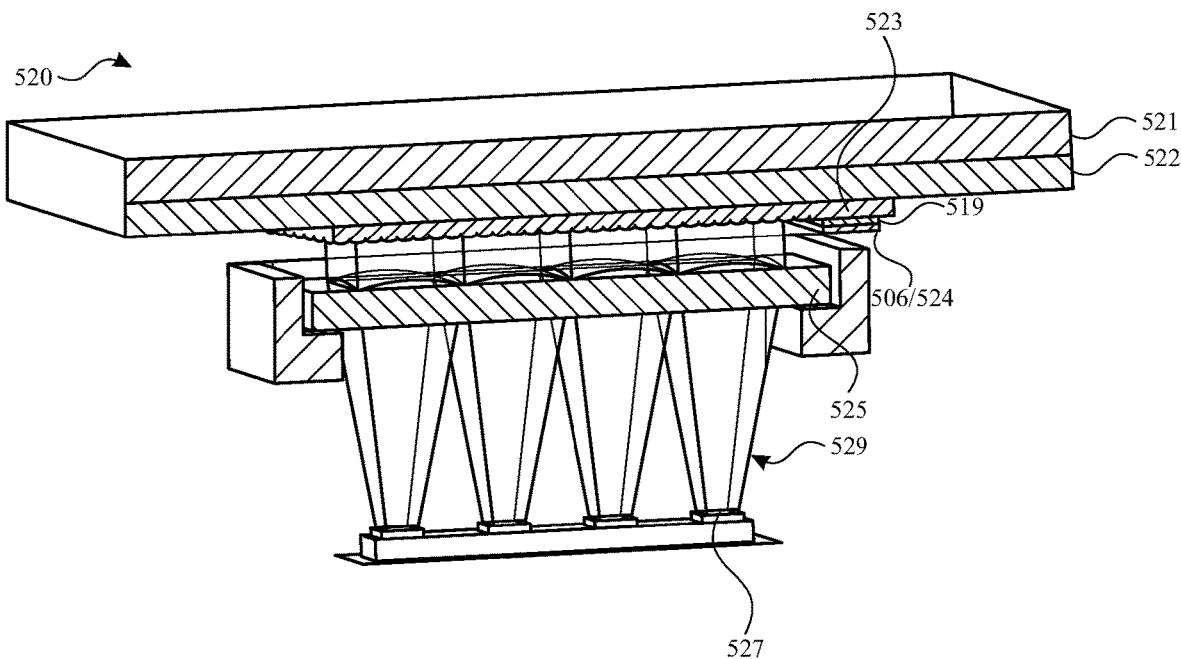
FIGS. 5A-5B illustrate exemplary perspective views of a material stack up and a simplified, single slice of the material stack up, respectively, of an electronic device, according to examples of the disclosure.
Figure 5B:
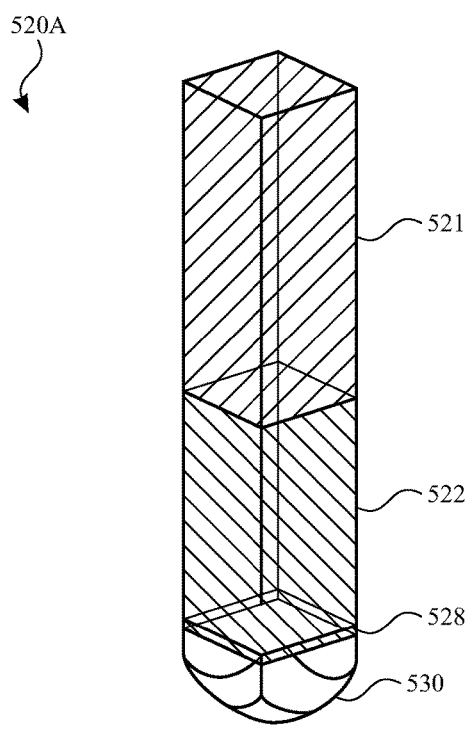

FIGS. 5A-5B illustrate exemplary perspective views of a material stack up and a simplified, single slice of the material stack up, respectively, of an electronic device, according to examples of the disclosure. FIG. 5A illustrates a perspective view of a material stack up 520 including an illumination system within an electronic device. As described previously above when referring to FIG. 2, the electronic device may comprise a touch screen 208 or other screen (e.g., non-touch display screen) disposed above one or more lenses 202. As shown in FIG. 5A, the material stack up (also referred to herein as "stack up") may comprise a display screen comprising cover glass 521 laminated over display 522 (e.g., a display layer in which display circuitry such as light emitting diodes, organic light emitting diodes, etc. can be disposed). As shown, the stack up 520 may further comprise an MLA 523 coupled (e.g., laminated or deposited) below the display 522, and finally one or more transducers 524 and/or acoustic integrity detection circuitry 506 coupled to the MLA 523 using adhesive 519. As described herein above, the transducers 524 and/or acoustic integrity detection circuitry 506 can be configured to generate acoustic/ultrasonic waves (e.g., shear horizontal waves) and to receive the reflected acoustic waves. As will be described hereinafter, the acoustic waves may propagate through the MLA 523, such that to detect impurities or discontinuities that may be present in or on the one or more lenses of the MLA 523.

As mentioned above, the electronic device may comprise an illumination system that utilizes the MLA 523. As shown in FIG. 5A, the illumination system may comprise a collimator 525 and one or more light emitters 527. Although not shown, a driver can be configured to drive the one or more light emitters 527 and collimator 525 can collimate beams of light emitted from the one or more light emitters 527. The driver may be in communication with the acoustic optical integrity detection circuit 206 and/or the acoustic optical integrity detection controller 210 as shown in FIG. 2, for example. As described herein, the one or more light emitters 527 (which may be lasers, for example) may be configured to selectively emit light 529. As shown as an example, the light 529 emitted from the one or more light emitters 527 may be directed through the collimator 525, which may include display-routing apertures, for example, such that the light 529 may be refracted by the MLA 523 through the display 522 for enabling high-power user-facing illumination functionality (e.g., illumination in the far field for facial recognition capabilities), among other possibilities. An impurity or discontinuity present in or on the MLA 523, such as a scratch, water ingression, or delaminated connection (between the MLA and display, for example), may hinder or prevent the light 529 (and thus optical power) from being effectively illuminated through the display 522. As will be discussed in more detail later, the ultrasonic transducers 524 and acoustic integrity detection circuitry 506 may provide an effective and reliable integrated detection method for the evaluation of the optical integrity of the MLA 523 to enable higher optical power output from the one or more emitters 527, and therefore increased device performance.

FIG. 5B illustrates a perspective view of a single slice 520A of the material stack up of FIG. 5A, shown in a simplified configuration. As mentioned above, an electronic device having a touch screen or other non-touch display screen may comprise cover glass 521, display 522, and MLA 523 arranged in a material stack up configuration in a notch of the electronic device. As shown in FIG. 5B, a single slice 520A of the material stack up 520 of FIG. 5B may highlight one lens 530 of the one or more lenses of the MLA 523. As an example, the MLA 523 may be an array of lenses of any suitable number and arrangement (e.g., 12×30 lenses, 15×35 lenses, 10×24 lenses, etc.). As shown, the lens 530 may be coupled to the display 522 via an adhesive layer 528 (e.g., an epoxy layer, pressure sensitive adhesive, etc.). As described herein, an adhesive layer (e.g., a portion of adhesive layer 528 or adhesive layer 519) may couple the transducers 524 and/or acoustic integrity detection circuitry 506 (not shown in FIG. 5B) to the display 522 and/or the MLA 523 (and thus the lens 530). As described in more detail below, the transmission of acoustic waves and reception of reflected acoustic waves may allow the optical surface of one or more lenses (e.g., lens 530) of the MLA 523 to be evaluated for any impurities or discontinuities.

FIGS. 6A-6B illustrate exemplary configurations for mounting one or more acoustic transducers 624 and/or acoustic integrity detection circuitry 606 to a lens array 623 in a material stack up of an electronic device according to examples of the disclosure. As discussed above when referring to FIGS. 5A-5B, the one or more transducers 624 and/or acoustic integrity detection circuitry 606 may be coupled to the MLA 623, such that ultrasonic waves generated by the one or more transducers 624 may propagate through the one or more lenses of the MLA 623, and reflected ultrasonic waves may be received by the one or more transducers 624. As discussed herein, a variety of mounting configurations are possible for effectively coupling the transducers 624 and/or acoustic integrity detection circuitry 606 to the MLA 623. FIGS. 6A-6B also illustrate cover glass 621 (e.g., corresponding to cover glass 521), a portion of housing 618 (e.g., corresponding to the portion of housing 518), collimator 625 (e.g., corresponding to collimator 525), and light 629 (e.g., corresponding to light 529) emitted by light emitters (not shown), the details of which are not repeated for brevity.

FIG. 6A illustrates a first exemplary configuration for mounting the transducers 624 and/or acoustic integrity detection circuitry 606 to the MLA 623. As shown in FIG. 6A, the transducers 624 and/or acoustic integrity detection circuitry 606 are optionally overlapped with a portion of a bottom surface of the MLA 623. In some examples, the transducers 624 are coupled between the MLA 623 and the display 622, where the one or more transducers can be implemented in one or more ultrasonic sensing layers 631. In some such examples, the acoustic integrity detection circuitry 606 (e.g., corresponding to acoustic integrity detection circuitry 206 and/or acoustic integrity detection circuit 400) can be coupled to the MLA 623 using adhesive 619 (e.g., corresponding to adhesive 519). As shown, the transducers may be implemented in one or more ultrasonic sensing layers 631 adhered to the display 622 via an adhesive layer 628 (e.g., corresponding to adhesive layer 528 in FIG. 5B), as discussed in more detail with reference to FIG. 7. The acoustic integrity detection circuitry can be configured to generate acoustic waves, detect reflected acoustic waves, and/or process the reflected acoustic waves, for example. In some examples, the transducers 624 and/or acoustic integrity detection circuitry 606 may be mounted on one side of the MLA 623 (e.g., the right side of the MLA 623 as shown in FIG. 6A, or on the left side of the MLA 623). Alternatively, in some examples, the transducers 624 and/or acoustic integrity detection circuitry 606 may be mounted on both sides of the MLA 623 (e.g., right and left sides on the underside of the MLA 623), as needed or desired. For example, multiple transducers may improve detection and/or localization of an impurity or discontinuity of the one or more lenses of the MLA 623.

FIG. 6B illustrates a second exemplary configuration for mounting the transducers 624 and/or acoustic integrity detection circuitry 606 to the MLA 623. As shown in FIG. 6B, the transducer 624 and/or acoustic integrity detection circuitry 606 are optionally abutted with a portion of a side of the MLA 623, such that the transducer 624 and/or acoustic integrity detection circuitry 606 are coupled between the MLA 623 and the display 622. In some examples, the transducer 624 and/or acoustic integrity detection circuitry 606 can be coupled to the MLA 623 and the display 622 using adhesive 619. In some examples, the transducers may be implemented in one or more ultrasonic sensing layers 631 adhered to the display 622 via an adhesive layer 628 (e.g., corresponding to adhesive layer 528 in FIG. 5B), as discussed in more detail with reference to FIG. 7. The acoustic integrity detection circuitry can be configured to generate acoustic waves, detect reflected waves, and/or process the reflected acoustic waves, for example. In some examples, the transducer 624 and/or acoustic integrity detection circuitry 606 may be mounted on one side of the MLA 623 (e.g., the right side of the MLA 623), as shown in FIG. 6B, or on the left side of the MLA 623. Alternatively, in some examples, the one or more transducers 624 and/or acoustic integrity detection circuitry 606 may be mounted on both sides (e.g., to the right and to the left) of the MLA 623, as needed or desired. For example, multiple transducers may improve detection and/or localization of an impurity or discontinuity of the one or more lenses of the MLA 623.

It should be understood that, as stated above, either of or both of the above transducer and/or acoustic integrity detection circuitry mounting configurations are possible to enable the effective transmission of acoustic waves and reception of reflected acoustic waves for integrity detection. However, there may be instances, separate from transducer functionality, in which one configuration may be preferable over the other, such as, for ease of integration and/or reduction in manufacturing costs.

Figure 7:
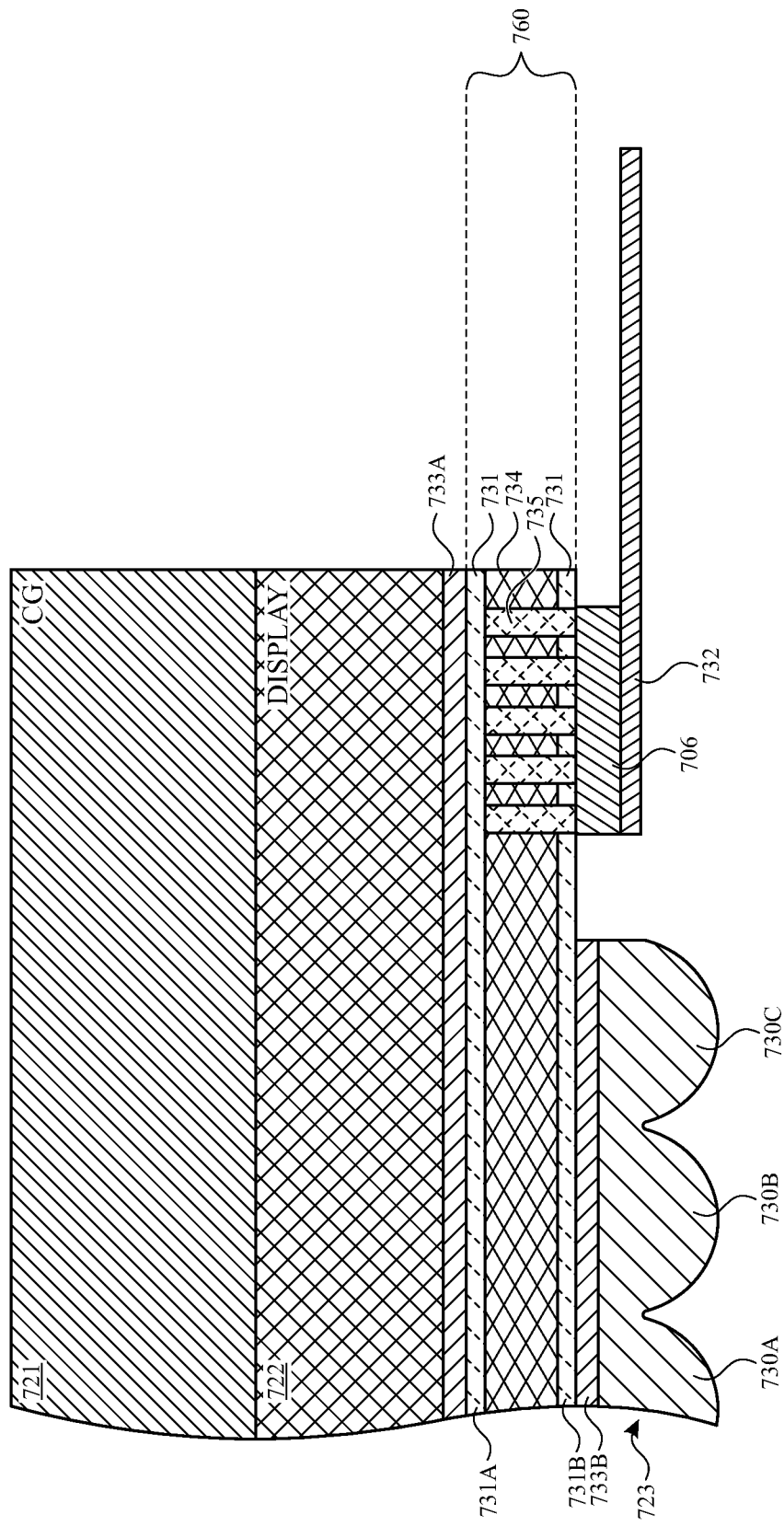
FIG. 7 illustrates an exemplary detailed side cross-sectional view of one or more acoustic transducers coupled between a display and a lens array according to examples of the disclosure.

As described herein, the acoustic transducers and/or acoustic integrity detection circuitry may be coupled to a display and/or a lens array within a material stack up of an electronic device. In some examples, the acoustic transducers may be coupled between a display and/or a lens array within a material stack up of an electronic device. The acoustic transducers may be configured to generate and transmit acoustic waves through one or more lenses of the lens array, such that any impurities and defects present in or on the one or more lenses will be captured by the reflected waves received by the acoustic transducers (via changes in wave characteristics, for example). FIG. 7 illustrates an exemplary detailed side cross-sectional view of an acoustic integrity detection assembly 760 (including one or more transducers and acoustic integrity detection circuitry) coupled between a display 722 and a lens array 723 according to examples of the disclosure. As described herein, the material layers and supporting circuitry forming the one or more acoustic transducers and/or acoustic integrity detection circuitry can be provided in a variety of configurations, as an example.

As shown in the detailed cross-sectional view of FIG. 7, the acoustic integrity detection assembly 760 (e.g., also referred to herein as optical integrity sensor(s) or an integrity sensing system) can include one or more material sublayers arranged in a stack up, as an example. In some examples, as shown in FIG. 7, acoustic integrity detection assembly 760 can include a substrate (e.g., a glass substrate) on which the one or more transducers can be disposed. As shown in the detailed view of FIG. 7, the corresponding sublayers that form the one or more transducers 724 can be represented by the one or more ultrasonic sensing layers 731, for example. As described in more detail when referring to FIGS. 8A-8C, the one or more ultrasonic sensing layers 731 may comprise discrete sublayers of electrodes and piezoelectric material, for example, with each transducer formed from a segment of piezoelectric material and two electrodes. As alluded to above, various configurations of the one or more ultrasonic sensing layers 731 may be provided to form the one or more transducers. In some examples, the ultrasonic sensing layer may be disposed only on top of the substrate 734 (e.g., a glass substrate), as shown by the upper ultrasonic sensing layer 731A. In some examples, the ultrasonic sensing layer may be disposed only on a bottom side of the substrate 734, as shown by the lower ultrasonic sensing layer 731B. In some examples, the ultrasonic sensing layer may be disposed on both the top and bottom of the substrate 734, as indicated by the ultrasonic sensing layers 731 (e.g., upper ultrasonic sensing layer 731A and lower ultrasonic sensing layer 731B).

In a first configuration, according to some examples, upper ultrasonic sensing layer 731A disposed on the top of the substrate 734 allows the use of acoustic waves to inspect/evaluate the integrity of the bottom surface of the display 722 (e.g., adjacent to the upper ultrasonic sensing layer 731A), which may be particularly useful for detecting discontinuities such as delamination (e.g., delamination of the substrate 734 from the display 722 due to adhesive failure of the epoxy layer 733A). In a second configuration, according to some examples, lower ultrasonic sensing layer 731B disposed on the bottom of the substrate 734 allows the use of acoustic waves to inspect the integrity of the top surface of the MLA 723 and the surfaces of the lenses 730A-730C of the MLA 723, which may be particularly useful for detecting discontinuities such as lens scratches, liquid ingressions contacting the surface of one or more lenses, and delamination (e.g., delamination of the top surface of the MLA 723 from the substrate 734 due to adhesive failure of the epoxy layer 733B). In a third configuration, according to some examples, ultrasonic sensing layers 731 disposed on the top and the bottom of the substrate 734 allow the use of acoustic waves to inspect the integrities of both the bottom surface of the display 722 and the top surface of the MLA 723, as well as the individual integrities of the lenses 730A-730C of the MLA 723. Thus, the number and placement of the ultrasonic sensing layers 731 may be selected according to one of the above configurations to inspect the optical integrity of various optical surfaces within the material stack up of the electronic device, based on the above considerations.

In some examples, such as in the material stack-up shown in FIGS. 5A-6B, no substrate 734 is provided. In some such examples, the substrate 734 may be removed, such that a single ultrasonic sensing layer may be formed directly atop the MLA 723 (e.g., on the flat surface of the MLA 723, as similarly shown by lower ultrasonic sensing layer 731B). The single ultrasonic sensing layer may then be coupled directly to the display 722 (via an adhesive layer, such as epoxy layer 733A), such that the ultrasonic sensing layer is disposed between the display 722 and the MLA 723 (e.g., in direct contact with the display and MLA). In this way, acoustic waves may be used to inspect the integrities of the bottom surface of the display 722 and the individual surfaces of the lenses 730A-730C of the MLA 723, such that to detect abnormal discontinuities such as lens scratches, liquid ingressions and delamination (e.g., delamination of the top surface of the MLA 723 from the bottom surface of the display 722).

As shown in FIG. 7, the acoustic integrity detection assembly 760 can be coupled to the display and MLA using adhesive epoxy layers 733A and 733B that may be provided along the bottom surface of the display 722 and along the top surface of the MLA 723, respectively. Thus, one or more transducers (e.g., formed from the one or more ultrasonic sensing layers 731) can be coupled to the display 722 and/or the one or more transducers can be coupled to the MLA 723. It should be understood that, in some examples, depending on the configuration of the ultrasonic sensing layers, the epoxy layers 733A and 733B may directly contact one or more surfaces of the substrate 734. It should also be understood that the adhesive epoxy layers 733A and 733B may comprise additional or alternative materials for coupling the transducers to the display 722 and/or the MLA 723. Additionally, as shown, the ultrasonic sensing layers 731 may be electrically connected to acoustic integrity detection circuitry 706 (e.g., corresponding to 206 in FIG. 2) using a suitable number of conductive vias 735 (e.g., metal vias), for example. It should be understood that the number of conductive vias 735 shown in FIG. 7 is merely an example, and that a greater or lesser number (e.g., two, three, seven, ten, etc.) of conductive vias 735 may be provided. It should also be understood that although vias 735 are shown that any suitable electrical connections may be used (e.g., an electrical wrap-around wire, wire bond, or cable). The acoustic integrity detection circuitry 706 may be coupled to a flex circuit (e.g., flexible printed circuit board) 732, which can be electrically connected to acoustic optical integrity detection controller (e.g., corresponding to 210 in FIG. 2) or other processing circuitry. In some examples, the one or more lenses (e.g., lenses 730A-730C) of the micro lens array can be constructed from suitable materials like glass or plastic, which may be selected based on application and other constraints such as temperature, for example.

Figure 8A:
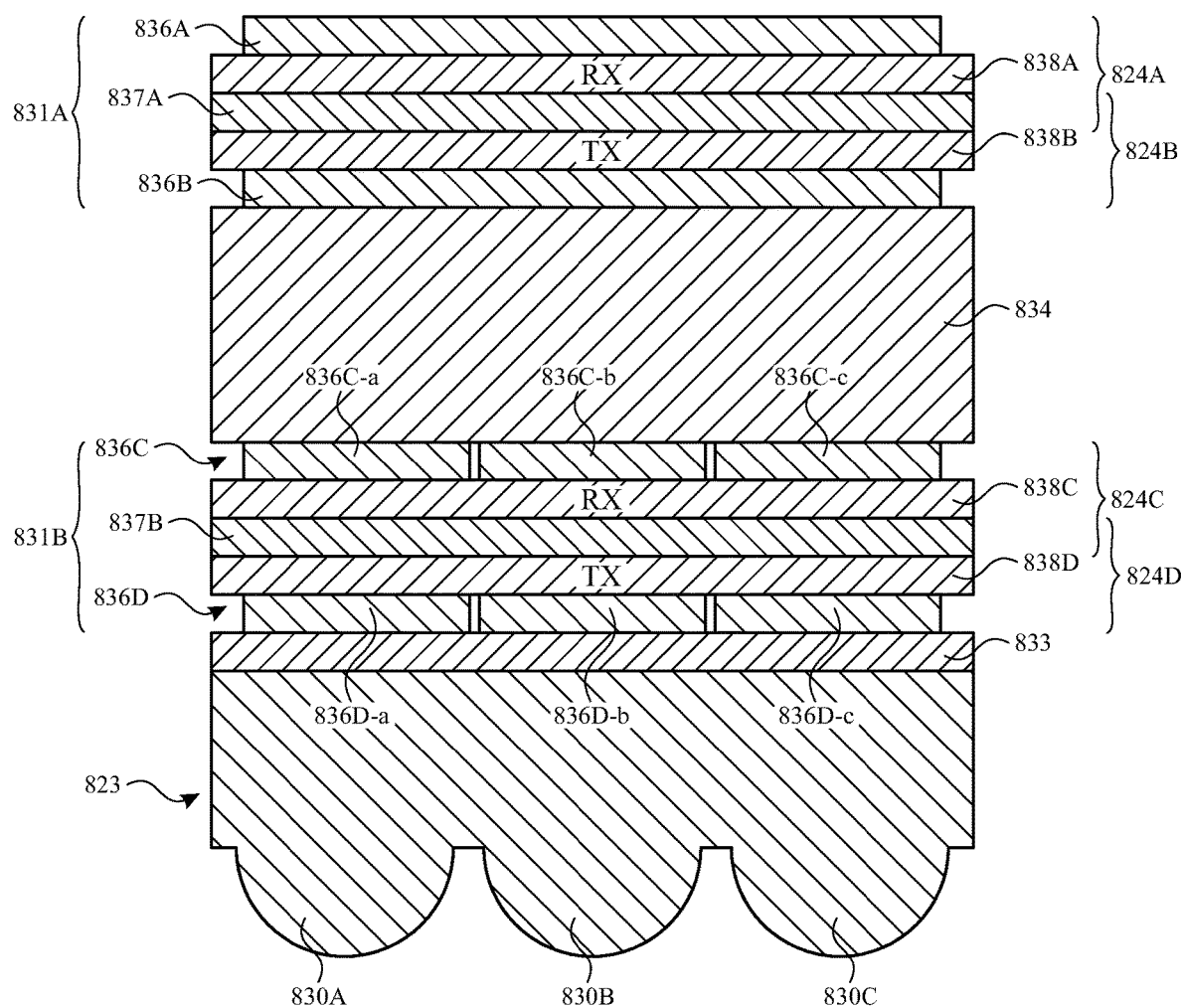
FIGS. 8A-8C illustrate exemplary detailed side cross-sectional views of example configurations of one or more ultrasonic sensing layers forming one or more acoustic transducers coupled to a lens array according to examples of the disclosure.
Figure 8B:
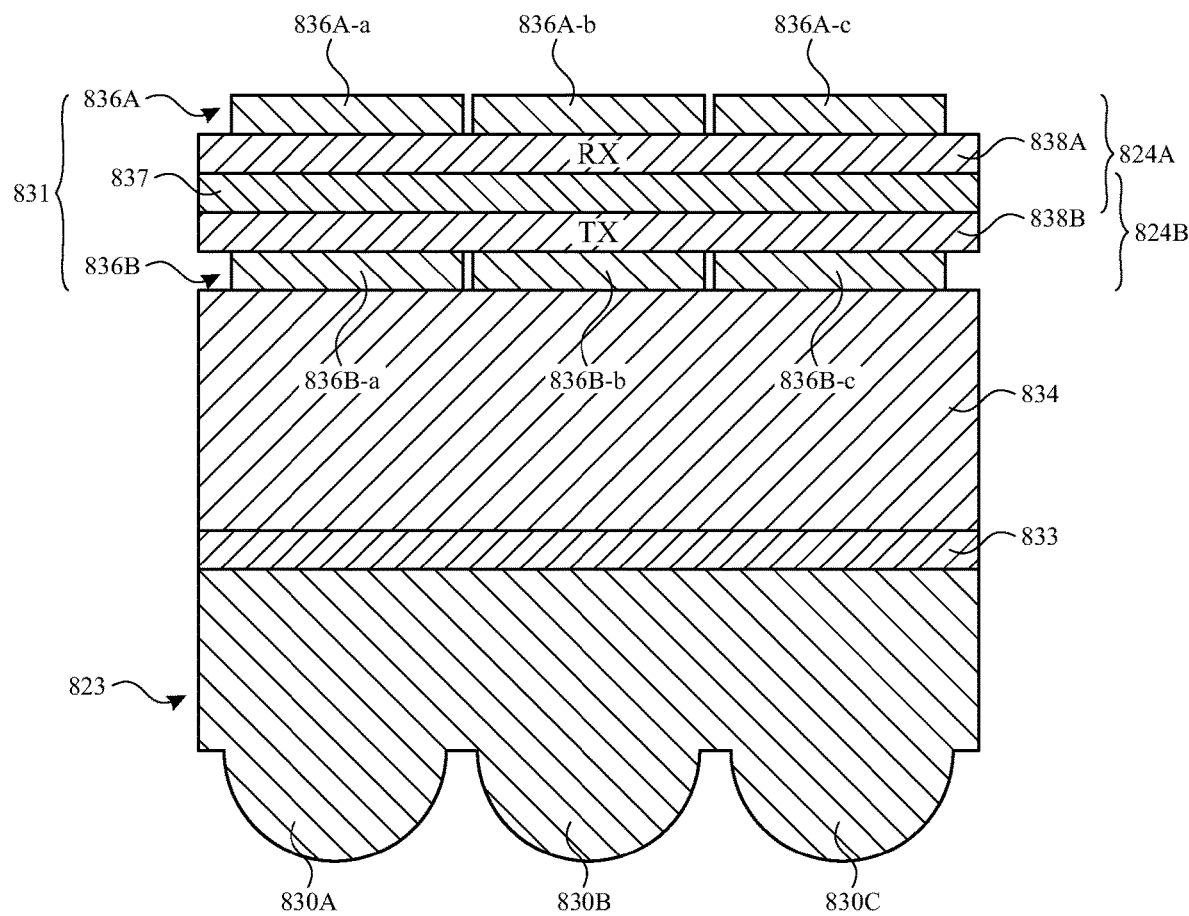
Figure 8C:
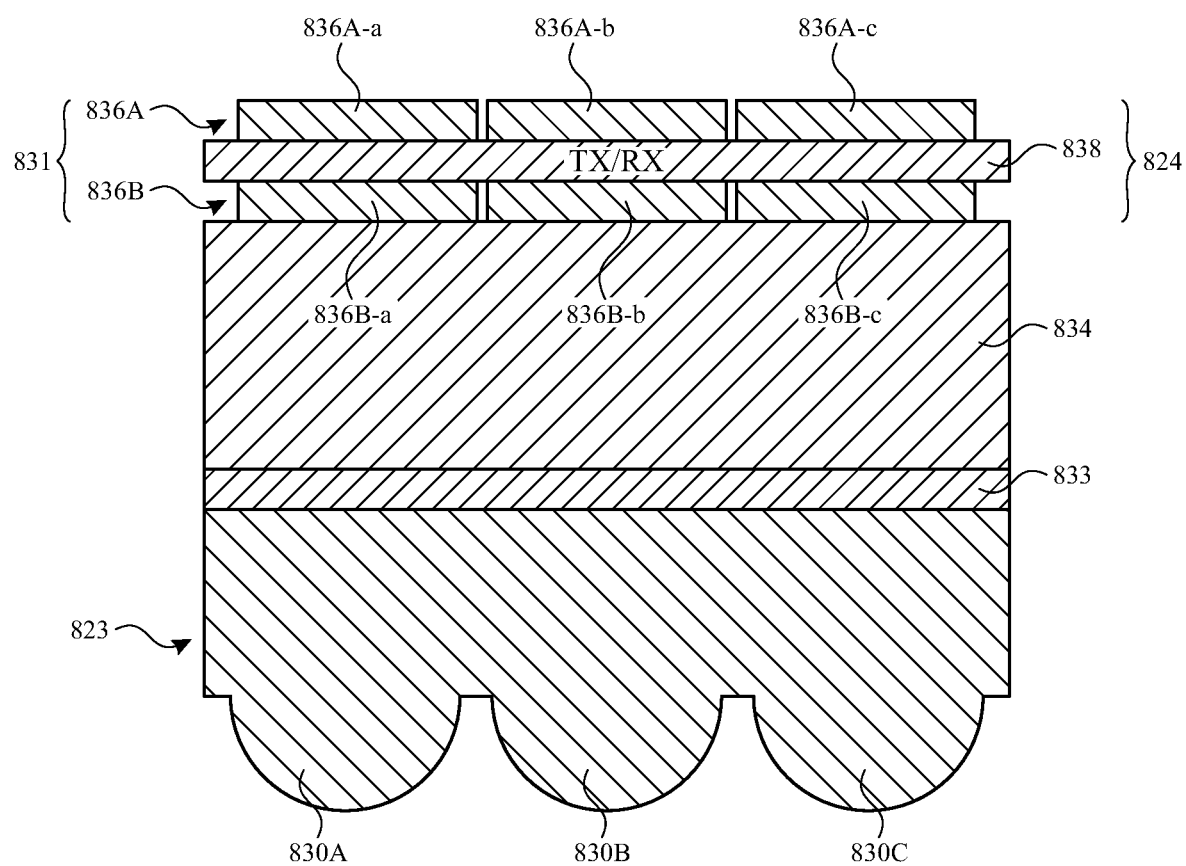

As outlined above, the acoustic transducers 724 may comprise one or more ultrasonic sensing layers (e.g., 731) forming transducers from which ultrasonic waves may be transmitted to probe/inspect the integrity of one or more surfaces within the material stack up of the electronic device related to an optical system. As mentioned above, the one or more ultrasonic sensing layers may comprise additional sublayers, including electrode layers and/or piezoelectric layers, for example. FIGS. 8A-8C illustrate exemplary detailed side cross-sectional views of example configurations of one or more ultrasonic sensing layers forming one or more acoustic transducers coupled to a lens array 823 according to examples of the disclosure.

As described previously above when referring to FIG. 7, in some examples, the material stack up of the electronic device may comprise a substrate (e.g., glass substrate) 834. As also discussed above, the one or more ultrasonic sensing layers 831 (e.g., 731 in FIG. 7) may be disposed on one side or on both sides of the glass substrate (e.g., 734). In some examples, a first and a second ultrasonic sensing layers are disposed on the top and bottom sides of the substrate 834, as shown in FIG. 8A. For example, FIG. 8A illustrates upper ultrasonic sensing layer 831A disposed on top of substrate 834 and lower ultrasonic sensing layer 831B disposed below substrate 834. In some examples, the ultrasonic sensing layer 831 is provided on one side. For example, FIGS. 8B-8C illustrate ultrasonic sensing layer 831 disposed atop the substrate 834. As shown in FIGS. 8A-8C, the substrate 834 can be coupled to the top (e.g., flat) surface of the MLA 823 via an epoxy adhesive layer 833, as described above. Although not shown in FIGS. 8A-8C an additional adhesive layer can be disposed on top of the upper ultrasonic sensing layer 831A or the ultrasonic sensing layer 831 on top of the substrate to couple the one or more transducers to the display.

As mentioned above and as shown in the detailed views of FIGS. 8A-8C, the one or more ultrasonic sensing layers (e.g., 831, 831A, 831B) may each include a plurality of electrode layers and one or more piezoelectric layers. Various configurations of the electrode layers and the piezoelectric layers may be used to form the one or more transducers. FIG. 8A illustrates an exemplary detailed cross-sectional view of a first configuration of the plurality of electrode layers 836A-836D, 837A-837B and the one or more piezoelectric layers 838A-838D according to examples of the disclosure.

As shown in FIG. 8A, a first ultrasonic sensing layer 831A and a second ultrasonic sensing layer 831B may be provided on the top and bottom surfaces of the substrate 834 (e.g., corresponding to ultrasonic sensing layers 731 in FIG. 7). In some examples, in the first configuration shown in the detailed view of FIG. 8A, a plurality of electrode layers and a plurality of piezoelectric layers may be provided within the first and the second ultrasonic sensing layers 831A and 831B. For example, referring to the first ultrasonic sensing layer 831A, a first electrode layer 836A, a second electrode layer 836B, and a third electrode layer 837A, may be provided, where the first electrode layer 836A, the second electrode layer 836B, and the third electrode layer 837A are optically transparent or semi-transparent electrodes (e.g., constructed of ITO, metal mesh, silver nano-wires, etc.). In this first configuration, the first electrode layer 836A may be configured as a receiver electrode (Rx electrode), the second electrode 836B may be configured as a transmitter electrode (Tx electrode), and the third electrode layer 837A may be configured as a ground electrode. Additionally, a first piezoelectric layer 838A and a second piezoelectric layer 838B may be provided (e.g., constructed of ZnO or AlN), where the first piezoelectric layer 838A is disposed between the ground electrode layer 837A and the RX electrode (e.g., first electrode layer 836A), and the second piezoelectric layer 838B is disposed between the ground electrode layer 837A and the Tx electrode (e.g., second electrode layer 836B). The first piezoelectric layer 838A, the first electrode layer 836A, and the ground electrode layer 837A may form a first receiver transducer 824A configured for receiving reflected acoustic waves; and the second piezoelectric layer 838B, the second electrode layer 836B, and the ground electrode layer 837A may form a transmitter transducer 824B configured for transmitting acoustic waves. As described herein, in some examples, the first electrode layer 836A and the second electrode layer 836B can include multiple electrodes so that an array of transducers 824A and/or an array of transducers 824B can be formed.

As shown in FIG. 8A, the second ultrasonic sensing layer 831B may be provided between the substrate 834 and the MLA 823. In some examples, as shown, the second ultrasonic sensing layer 831B may include an array of transducers 824C and 824D disposed across the bottom surface of the substrate 834. As shown, a fourth electrode layer 836C, a fifth electrode layer 836D, and a sixth electrode layer 837B can be optically transparent or semi-transparent electrodes (e.g., ITO, metal mesh, etc.). The fourth electrode layer 836C may be pixelated, as shown, such that a plurality of patterned first electrodes (e.g., Rx electrodes) are provided, including a first receiver electrode pixel 836C-a, a second receiver electrode pixel 836C-b, and a third receiver electrode pixel 836C-c. Similarly, the fifth electrode layer 836D may be pixelated, as shown, such that a plurality of patterned second electrodes (e.g., Tx electrodes) are provided, including a first transmitter electrode pixel 836D-a, a second transmitter electrode pixel 836D-b, and a third transmitter electrode pixel 836D-c. As shown, the second ultrasonic sensing layer 831B may further include a third piezoelectric layer 838C and a fourth piezoelectric layer 838D disposed between the ground electrode layer 837B and the fourth and fifth electrode layers 836C-836D, respectively. In this example, the plurality of patterned first electrodes 836C-a-836C-c may be configured to share the third piezoelectric layer 838C, and the plurality of patterned second electrodes 836D-a-836D-c may be configured to share the fourth piezoelectric layer 838D, such that to create a first array of transducers 824C and a second arrays of transducers 824D, with one receiver-configured transducer of the first array of transducers and one transmitter-configured transducer of the second array of transducers formed over a respective lens of the MLA 823. For example, the receiver electrode pixels 836C-a-836C-c of the fourth electrode layer 836C, the third piezoelectric layer 838C, and the ground electrode layer 837B may form an array of receiver transducers 824C each configured for receiving reflected acoustic waves; and the transmitter electrode pixels 836D-a-836D-c of the fifth electrode layer 836D, the fourth piezoelectric layer 838D, and the ground electrode layer 837B may form an array of transmitter transducers 824D each configured for transmitting acoustic waves. In this way, each lens 830A-830C of the MLA 823 may be provided with a corresponding pair of a receiver-configured transducer and a transmitter-configured transducer configured to individually probe the integrity of a respective lens by transmitting an ultrasonic wave and receiving one or more respective reflections from the respective lens.

With continued reference to the first configuration of electrode and piezoelectric layers described above and shown in FIG. 8A, the optical surface of the display (e.g., corresponding to display 722 in FIG. 7) can be probed using acoustic waves transmitted from the first ultrasonic sensing layer 831A. The transmitter transducer 824B, formed from the second electrode 836B and the second piezoelectric layer 838B (and the shared ground electrode layer 837A), can transmit acoustic waves upward to the display (not shown) and generate detectable reflections from the bottom surface of the display. The receiver transducer 824A, formed from the first electrode 836A and the first piezoelectric layer 838A (and the ground electrode layer 837A), can receive energy from reflected waves, for example. As described herein, the presence of impurities or abnormal discontinuities along the bottom surface of the display (e.g., due to delamination) can cause a change in the transmitted acoustic waves, which can be detected in the reflected acoustic waves (e.g., based on changes in amplitude, time-of-flight, period, etc. of the received signal compared with a baseline signal) received at the receiver transducer 824A. Thus, the integrity of the optical system as it relates to the bottom surface of the display (e.g., display 722 in FIG. 7, through which light from light emitters passes through) may be evaluated by transmitting an ultrasonic wave and receiving one or more respective reflections.

Similarly, the optical surfaces of the exemplary lenses 830A-830C of the MLA 823 can be probed using acoustic waves transmitted from the second ultrasonic sensing layer 831B. For example, the array of transmitter transducers 824D, formed from the plurality of patterned second electrodes 836D-a-836D-c and the fourth piezoelectric layer 838D (and the ground electrode layer 837B), can each transmit acoustic waves through the substrate 834 and generate detectable reflections from each lens of the MLA 823. The array of receiver transducers 824C, formed by the plurality of patterned first electrodes 836C-a-836C-c and the third piezoelectric layer 838C (and the ground electrode layer 837B), can receive energy from the reflected waves. The presence of impurities or abnormal discontinuities in any of the lenses 830A-830C of the MLA 823 can cause a change to the transmitted acoustic waves, which can be detected in the reflected acoustic waves (e.g., based on changes in amplitude, time-of-flight, period, etc. of the received signal compared with a baseline signal) received at the array of receiver transducers 824C. Additionally, the presence of impurities or abnormal discontinuities (e.g., due to delamination) on the top surface of the MLA 823 can cause a change to the transmitted acoustic waves, which can be detected in the reflected acoustic waves. Thus, the integrity of the lenses (e.g., lenses 830A-830C), and the top surface, of the MLA 823 may be evaluated by transmitting one or more ultrasonic waves and receiving one or more respective reflections.

It should be understood that the configurations of the plurality of electrode layers and the plurality of the piezoelectric layers within the exemplary material stack up of FIG. 8A may be altered, as needed or desired. For example, the first ultrasonic sensing layer 831A may alternatively be provided as an array disposed across the top surface of the substrate 834 and similar in configuration to the second ultrasonic sensing layer 831B. As another example, the second ultrasonic sensing layer 831B may alternatively be implemented without pixelated electrodes similar in configuration to the first ultrasonic sensing layer 831A. As another example, the exemplary configurations of the first ultrasonic sensing layer 831A and the second ultrasonic sensing layer 831B may be switched, such that the first ultrasonic sensing layer 831A is a pixelated array and the second ultrasonic sensing layer 831B is not. In some examples, the piezoelectric material and/or ground electrode can also be divided into segments with discrete segments for each transducer. Additionally or alternatively, the transducers configured as transmitters and receivers can use separate ground electrodes rather than sharing a common ground electrode. Additionally or alternatively, the transducer functionality of a transmitter and receiver pair can be merged into one transducer (e.g., as described with reference to FIG. 8C).

FIG. 8B illustrates an exemplary detailed cross-sectional view of a second configuration of the plurality of electrode layers 836A-836B, 837 and the one or more piezoelectric layers 838A-838B according to examples of the disclosure. As shown in FIG. 8B, an ultrasonic sensing layer 831 may be provided on the top surface of the substrate 834 (e.g., as shown previously by upper ultrasonic sensing layer 731A in FIG. 7).

In some examples, in the second configuration shown in the detailed view of FIG. 8B, the ultrasonic sensing layer 831 may be provided as an array disposed across the top surface of the substrate 834. A first electrode layer 836A, a second electrode layer 836B, and a third electrode layer 837 can be optically transparent or semi-transparent electrodes (e.g., ITO, metal mesh, etc.). The first electrode layer 836A may be pixelated to form a plurality of patterned first electrodes (e.g., Rx electrodes), including a first receiver electrode pixel 836A-a, a second receiver electrode pixel 836A-b, and a third receiver electrode pixel 836A-c. Similarly, the second electrode layer 836B may be pixelated to form a plurality of patterned second electrodes (e.g., Tx electrodes), including a first transmitter electrode pixel 836B-a, a second transmitter electrode pixel 836B-b, and a third transmitter electrode pixel 836B-c. The third electrode layer 837 may be configured as a ground electrode layer. As shown, the ultrasonic sensing layer 831 may further include a first piezoelectric layer 838A and a second piezoelectric layer 838B disposed on opposite sides of the ground electrode layer 837. In this example, the plurality of patterned first electrodes 836A-a-836A-c, the first piezoelectric layer 838A, and the ground electrode form transducers in a receiver configuration. The plurality of patterned second electrodes 836B-a-836B-c, the second piezoelectric layer 838B, and the ground electrode form transducers in the transmitter configuration. As shown, a first transducer array 824A and a second transducer array 824B can be formed with one receiver-configured transducer and one transmitter-configured transducer formed over a respective lens of the MLA 823. In a similar manner as described with respect to FIG. 8A, the corresponding pair of a receiver and transmitter transducers can be configured to individually probe the optical integrity of a respective lens (through substrate 834) by transmitting an ultrasonic wave and receiving one or more respective reflections from the respective lens.

It should be understood that the configuration of the plurality of electrode layers and the plurality of the piezoelectric layers within the exemplary material stack up of FIG. 8B may be altered, as needed or desired. For example, the ultrasonic sensing layer 831 may not be pixelated similar in configuration to the first ultrasonic sensing layer 831A shown in FIG. 8A. As another example, the ultrasonic sensing layer 831 may alternatively be provided on the bottom surface of the substrate 834 (e.g., as shown previously by lower ultrasonic sensing layer 731B in FIG. 7). In some examples, the piezoelectric material and/or ground electrode can also be divided into segments with discrete segments for each transducer. Additionally or alternatively, the transducers configured as transmitters and receivers can use separate ground electrodes rather than sharing a common ground electrode.

As described above with reference to FIGS. 8A-8B, the one or more ultrasonic sensing layers (e.g., ultrasonic sensing layers 831A-831B, 831) may comprise a plurality of piezoelectric layers (e.g., a first piezoelectric layer 838A, a second piezoelectric layer 838B, a third piezoelectric layer 838C, etc.), with some transducers configured for separate transmitter or receiver functionality. Additionally or alternatively, in some examples, the one or more ultrasonic sensing layers may comprise a single piezoelectric layer, as described below, to form transducers that can be configured to perform both the transmitter and receiver functions. FIG. 8C illustrates an exemplary detailed cross-sectional view of a third configuration of the plurality of electrode layers 836A-836B and the one or more piezoelectric layers 838 according to examples of this disclosure. As shown in FIG. 8C, an ultrasonic sensing layer 831 may be provided on the top surface of the substrate 834 (e.g., as shown previously by upper ultrasonic sensing layer 731A in FIG. 7).

In some examples, in the third configuration shown in the detailed view of FIG. 8C, the ultrasonic sensing layer 831 may be disposed across the top surface of the substrate 834, and may comprise two electrode layers and one piezoelectric layer. For example, a first electrode layer 836A and a second electrode layer 836B may be provided, where the first electrode layer 836A and the second electrode layer 836B are optically transparent or semi-transparent electrodes. The first electrode layer 836A and/or the second electrode layer may be pixelated. As shown, FIG. 8C includes a first electrode 836A-a, a second electrode 836A-b, a third electrode 836A-c, a fourth electrode 836B-a, a fifth electrode 836B-b, and a sixth electrode 836B-c. Additionally, a single piezoelectric layer 838 may be provided, where the single piezoelectric layer 838 is disposed between the first electrode layer 836A and the second electrode layer 836B. In this example, the pluralities of patterned first electrodes 836A-a-836A-c, the pluralities of patterned second electrodes 836B-a-836B-c, and the piezoelectric layer 838 can form an array of transducers 824, each transducer formed over a respective lens of the MLA 823, where each of the transducers can be operated in a transmit configuration to generate ultrasonic wave and then a receive configuration to receive ultrasonic reflections. A transducer configured in such a way can be used to individually probe the optical integrity of a respective lens by transmitting an ultrasonic wave and receiving one or more respective reflections from the respective lens (e.g., through substrate 834).

It should be understood that the configuration of the plurality of electrode layers and the plurality of the piezoelectric layers within the exemplary material stack up of FIG. 8C may be altered, as needed or desired. For example, although both electrode layers are illustrated to be pixelated in FIG. 8C, one of the electrode layers (e.g., a ground layer) may not be pixelated. In some examples, the ultrasonic sensing layer 831 may not be pixelated similar in configuration to the first ultrasonic sensing layer 831A shown in FIG. 8A, but merging the transmitter and receiver functionality for transducers implemented with a single piezoelectric layer 838. As another example, the ultrasonic sensing layer 831 may alternatively be provided on the bottom surface of the substrate 834 (e.g., as shown previously by lower ultrasonic sensing layer 731B in FIG. 7). As another example, the ultrasonic sensing layer 831, having a single piezoelectric layer 838, may be provided on both the top and bottom surfaces of the substrate 834 (e.g., as shown previously by ultrasonic sensing layers 731 in FIG. 7). In some examples, the piezoelectric material can also be divided into segments with discrete segments for each transducer.

As mentioned above, in the first and the second configurations of FIGS. 8A and 8B, the one or more sub-layers may include, within a respective ultrasonic sensing layer, two piezoelectric layers, wherein the first piezoelectric layer (e.g., 838A) may form a receiver transducer and the second piezoelectric layer (e.g., 838B) may form a transmitter transducer. The separation of the transmitter and receiver piezoelectric layers can reduce crosstalk because excitation/vibration of the transmitter piezoelectric layer (e.g., second piezoelectric layer 836B) (which may be at a high voltage (e.g., 1V)) can be separate and thus independent of the resulting vibration of the receiver piezoelectric layer (e.g., first piezoelectric layer 836A). Particularly, separate transmitter and receiver transducers may be beneficial when transmitting acoustic waves over short distances (e.g., when the total thickness of the layers between the ultrasonic sensing layer and a layer of interest, such as the lenses of the MLA 823, is relatively small), because a crosstalk between the transmitted acoustic waves and reflected acoustic waves may be relatively low and/or negligible, allowing changes in the reflected waves to be detected. In some examples, short distances can refer to a distance less than or equal to three times the wavelength of ultrasonic energy in the intermediate layers between the transducers and a discontinuity that generates a reflection of interest (e.g., at the interfaces of layers at which lamination occurs, at the surface of MLA 823, etc.). In some examples, the wavelength of the ultrasonic energy in the intermediate layers may be computed from the frequency of the transmitted ultrasonic energy and the velocity of the ultrasonic energy in the intermediate layer(s). Having the transmitter and receiver functionality in a shared transducer may comparatively be less functionally reliable over short distances because the shared functionality transducer receives portions of the energy emitted by the transmitter as crosstalk between the transmitter and receiver transducers (e.g., due to ringing resulting from the stimulation masking reflections).

In some examples, the substrate 834 may be omitted, such that an ultrasonic sensing layer may be disposed directly atop the MLA 823 (e.g., on the flat surface of the MLA 823, as similarly shown by lower ultrasonic sensing layer 731B in FIG. 7).

As discussed herein, one or more transducers coupled between a display and an optical system (e.g., a lens array) may be configured to generate ultrasonic waves that propagate to one or more optical components (e.g., lenses) of the optical system and to receive reflected ultrasonic waves from one or more optical surfaces (e.g., lens surfaces) of the optical components for evaluating the optical integrity of the optical system. As described above, one or more characteristics of the reflected ultrasonic waves may change (as compared to the transmitted ultrasonic wave) in the event that one or more impurities or discontinuities are encountered by the transmitted ultrasonic wave. The one or more impurities or discontinuities may be any impurity or discontinuity present on, in, and/or near the optical surface of a respective optical component. The one or more characteristics of the reflected ultrasonic waves may be analyzed and processed (e.g., by acoustic integrity detection circuitry 206 and/or controller 210 in FIG. 2) to determine a position, type, and/or severity of the one or more impurities or discontinuities.

As used herein, the terms "impurity," "discontinuity," "defect," "imperfection," "abnormal discontinuity" and the like are often used interchangeably. In general these terms refer to any surface or near-surface anomaly that can hinder, interfere with, or otherwise prevent an intended use of the optical system. For example, an impurity can be a scratch or scratches in one or more lenses of a lens array. An impurity can be a smashed, broken, or missing lens or lenses in a lens array. As another example, an impurity can be liquid ingression (e.g., water ingression) contacting one or more lenses of a lens array. As another example, an impurity can be a delamination (e.g., decoupling) of a lens array from a display (or other component). As a transmitted acoustic wave propagates through a lens array, for example, an impurity presents a delimitation or barrier to the transmitted acoustic wave that generates a change in the reflected acoustic wave propagating from the impurity.

FIGS. 9A-9F illustrate exemplary signal diagrams demonstrating acoustic detection of optical integrity of an optical system according to examples of the disclosure. It should be noted that the exemplary signal diagrams shown in FIGS. 9A-9F represent signals (e.g., analog signals) representative of reflections received by the one or more transducers in one or more of the example configurations of FIGS. 8A-8C. It should be understood that the diagram headings of the signal diagrams (e.g., "top sensor, RX layer", "top sensor, TX layer", "bottom sensor, RX layer", "bottom sensor, TX layer"), may correspond to a configuration including ultrasonic sensing layers each with two piezoelectric layers (e.g., 838A and 838B in FIG. 8A) and three electrode layers (e.g., 836A, 836B and 837A) configured as separate receiver and transmitter transducers.

FIGS. 9A-9F illustrate example signal diagrams 940A-940L simulating impurity at an MLA detected according to the disclosed acoustic integrity detection methods. As shown in FIGS. 9A-9F, as indicated by diagram legend 941, the signal diagrams illustrate a baseline signal 942 (e.g., signal corresponding to measurement of the acoustic energy at each of the transducers in the absence of an impurity/unexpected discontinuity) and a reflection signal 943 (e.g., a signal corresponding to the acoustic energy at each of the transducers in the presence of the impurity/unexpected discontinuity) expressed in terms of voltage (in microvolts [μV]) over time (in nanoseconds [ns]), for example. In some examples, the reflection signals 943 can be compared with the baseline signals 942, and a departure in one or more characteristics of the reflection signals from the baseline signal can be indicative of a defect. It should be understood that the respective baseline signals 942 for the upper ultrasonic sensing layer and for the lower ultrasonic sensing layer can be the same for all respective signal diagrams shown in FIGS. 9A-9F.

In some examples, a correlation between the reflection signal 943 and the baseline signal 942 can be computed and when the correlation falls below a threshold, an impurity can be detected. In some examples, a magnitude squared of the difference between the reflection signal 943 and the baseline signal 942 (e.g., an energy metric) can be computed and when the computed value exceeds a threshold, an impurity can be detected. In some examples, a defect can be detected based on the appearance of a new peak in the reflection signal 943 that does not appear in the baseline signal 942. It should be understood that the above are exemplary means of comparison between the reflection signal 943 and the baseline signal 942, but that other changes in characteristics can be used (e.g., changes in frequency of oscillation, phase, amplitude, etc.)

Figure 9A:
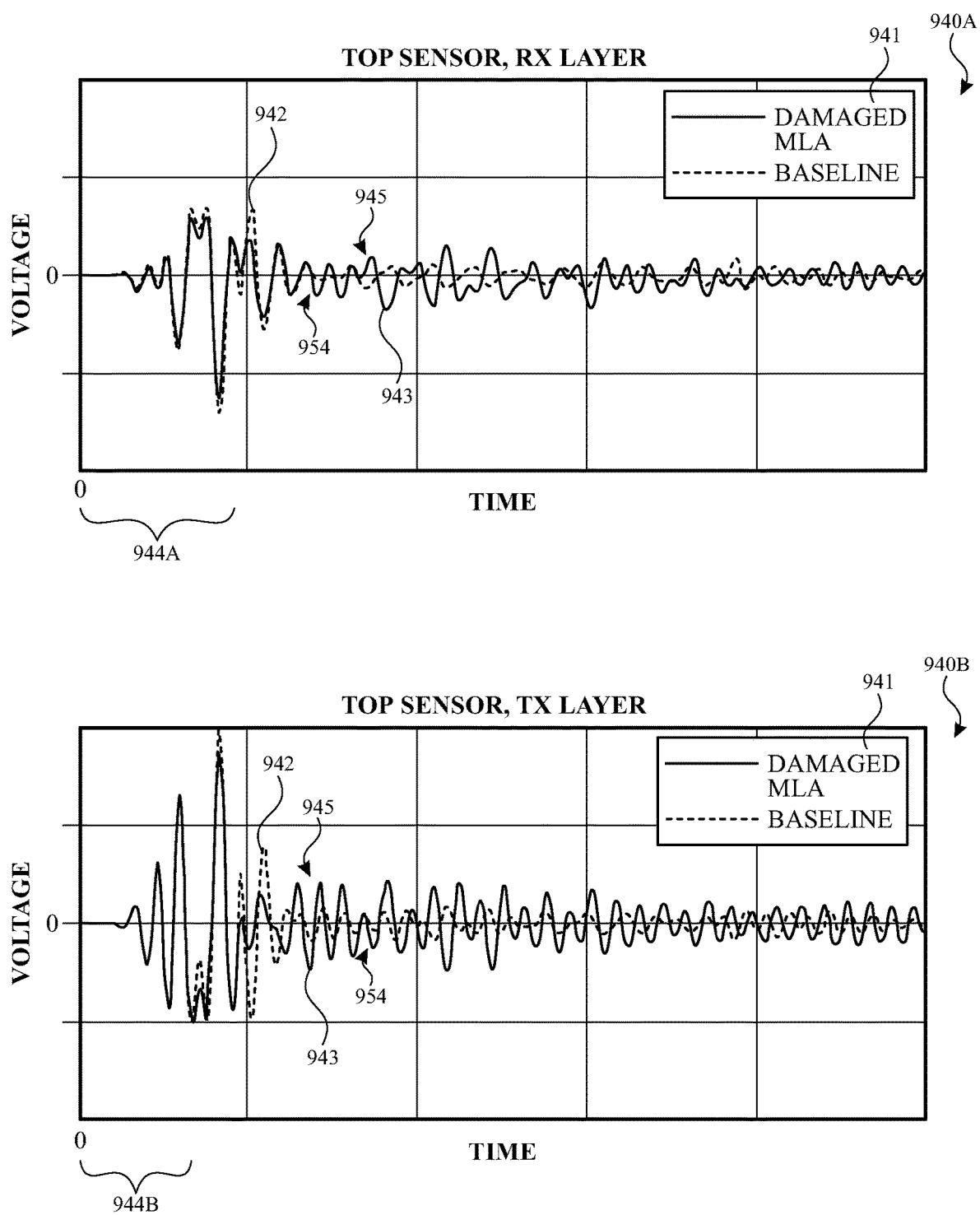
FIGS. 9A-9F illustrate exemplary signal diagrams demonstrating acoustic detection of optical integrity of an optical system according to examples of the disclosure.
Figure 9B:
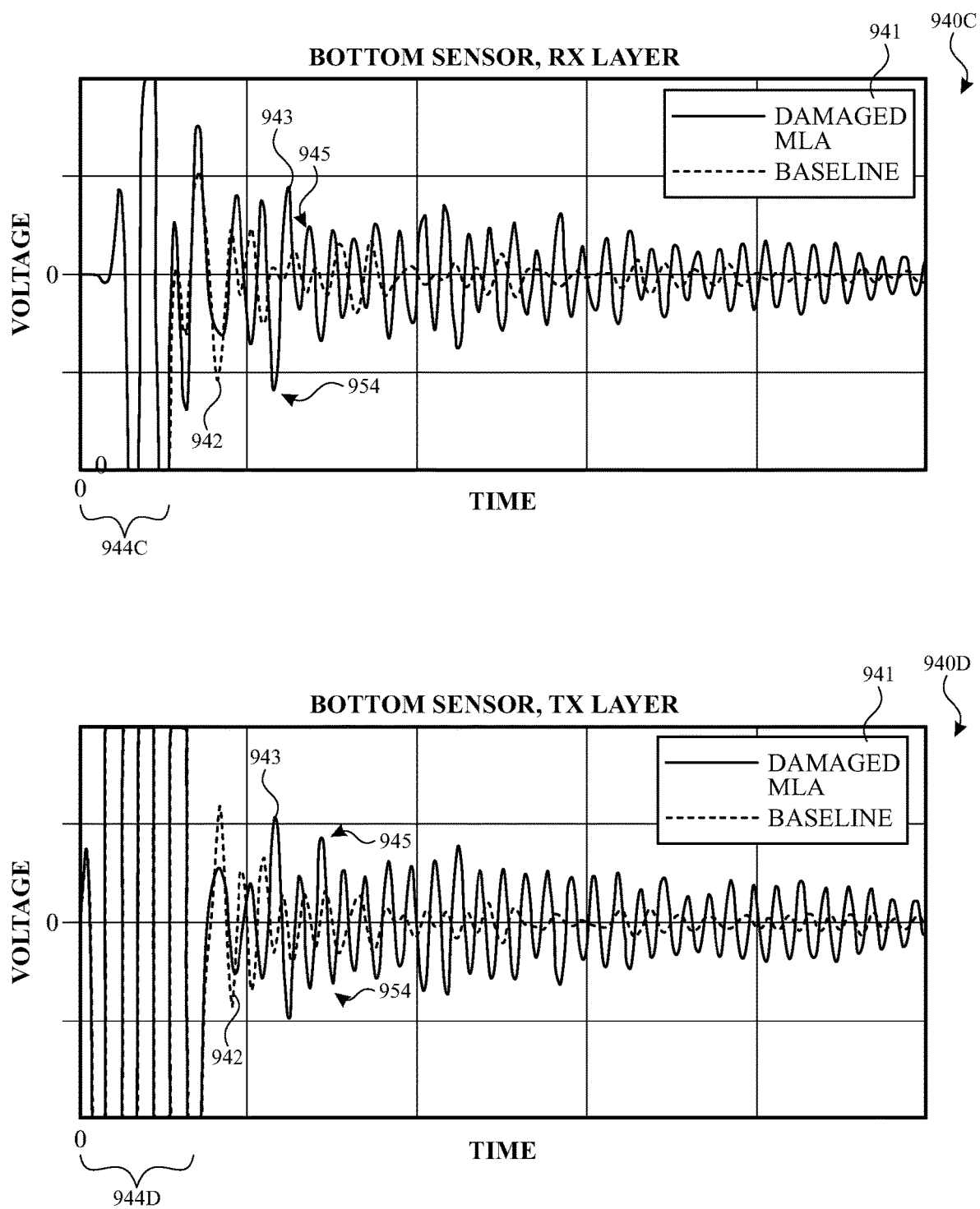

FIGS. 9A-9B illustrate a simulation of a delamination impurity. Generally a delamination impurity can be detected at any location within the stack up including, but not limited to, between the cover glass 721 and display 722, internal to the display 722, at the adhesive layer 733A at the bottom of the display, between the adhesive layer 733A at the bottom of the display and the ultrasonic transducers in the ultrasonic sensing layer 731 (above substrate 734), between the ultrasonic transducers in the ultrasonic sensing layer 731 (below substrate 734) and the adhesive layer 733B above the MLA 723, and between the adhesive layer 733B and the MLA 723. FIGS. 9A-9B illustrates a simulation of delamination of the MLA 723 at epoxy layer 733B. Signal diagrams 940A and 940B can correspond to the transducers in the upper ultrasonic sensing layer ("top sensor") and signal diagrams 940C and 940D can correspond to the transducers in the lower ultrasonic sensing layer ("bottom sensor").

As shown in FIGS. 9A-9B, the bottom transducer in a transmit configuration (e.g., corresponding to transducer(s) 824D), as indicated by the signal amplitude appearing greatest for signal diagram 940D in initial period 944A, and with declining amplitude at corresponding times in signal diagrams 940C, 940B, and 940A as the distance of the corresponding transducers increases from the stimulating transducer (e.g., transducers 824D). For some initial period 944A-944D in signal diagrams 940A-940D, the baseline signal 942 and the reflection signal 943 may be identical or substantially identical, such that the two signals continuously overlap or substantially overlap during the initial period 944A-944D (which may be of different duration for each of the signal diagrams 940A-940D, for example. Then, after the initial period 944, relative peaks (e.g., peaks 945) and troughs (e.g., troughs 954) of the reflection signal 943 begin to depart from the peaks and troughs of the baseline signal 942 The reflection signal from one of the transducers (or reflection signals from multiple of the transducers) can be used to identify the existence of the delamination impurity (e.g., based on a threshold drop in correlation to the baseline or increase in magnitude squared of the departure of form the waveform).

In some examples, the existence of a delamination impurity at a specified location within the stack up can be determined. For example, the position of the impurity can be determined based on an amount of time between transmission of the acoustic wave and detection of deviation in the reflection signal (time following the initial period 944) by the transducers. For example, in signal diagram 940A an extra oscillation can be detected in the reflection signal beginning at trough 954 that does not appear in the baseline signal. The distance between the transducer and the impurity can be determined using that time, sometimes referred to as time-of-flight (TOF), and using the speed of propagation of the acoustic wave in the surface medium (e.g., glass or epoxy), which can be a known quantity or can be empirically measured, for example. As such, the location of the delamination impurity can be located, such that corrective steps can be taken, as applicable (e.g., repairing the delamination damage, discarding a unit, disabling or compensating operation of an optical system). It should be noted that, in some examples, multiple different TOF measurements may be determined for multiple of the signal diagrams 940A-940D shown in FIGS. 9A-9B. In such examples, an average (or some other mathematical operation) can be performed to generate a general location of the delamination impurity within the stack up, for example.

In some examples, the reflection signal can be compared within a specific window of time defined based on the propagation speed of the acoustic/ultrasonic energy and the distance between the specific location and the transducer(s) configured in the transmit configuration and/or the distance between the specific location and the transducer(s) configured in the receive configuration to detect a departure from the baseline signal within the specific window to detect delamination at the corresponding location within the stack up. It should be understood that different windows of time may be examined in a similar manner to detect delamination at other regions within the stack up.

Figure 9C:
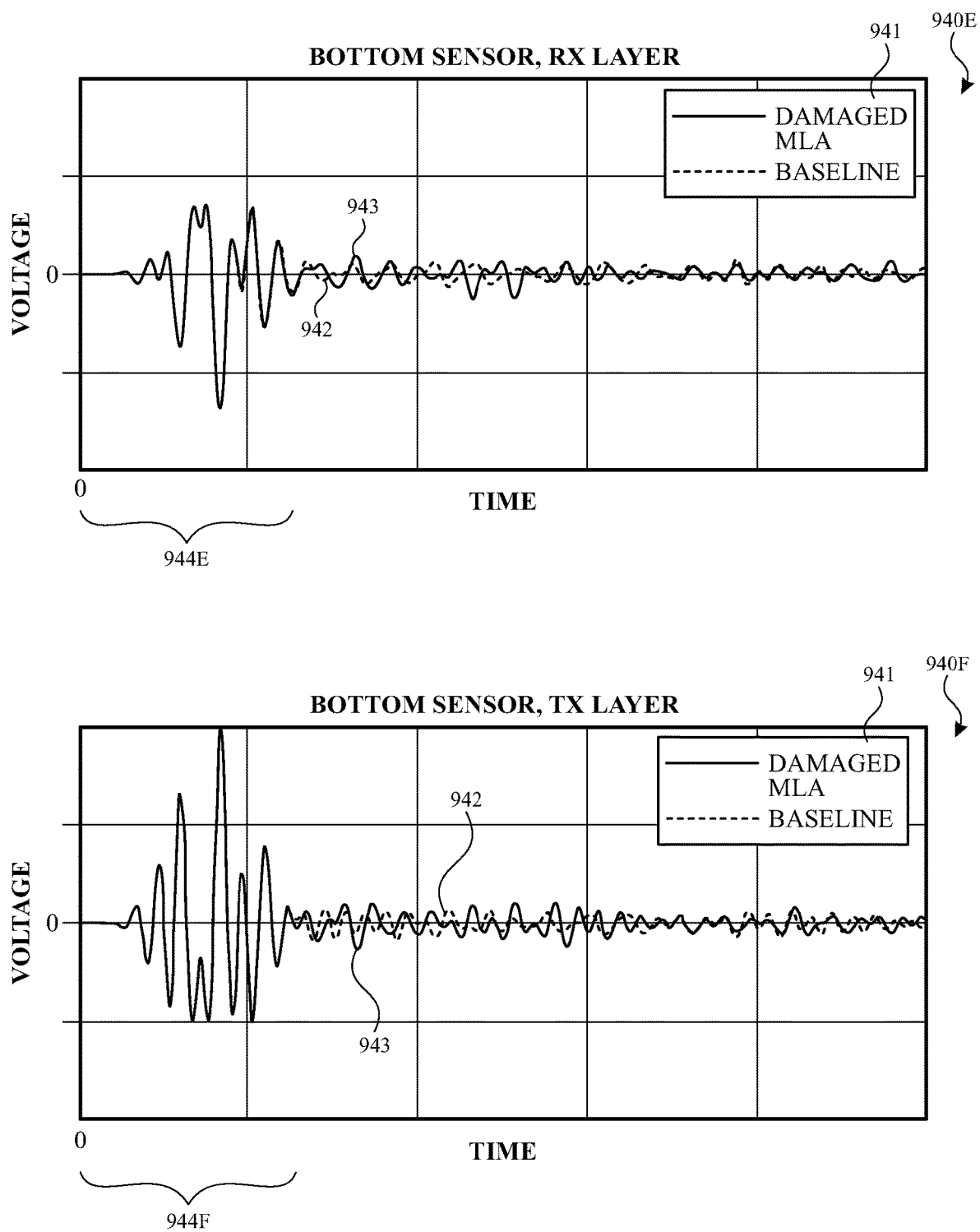
Figure 9D:
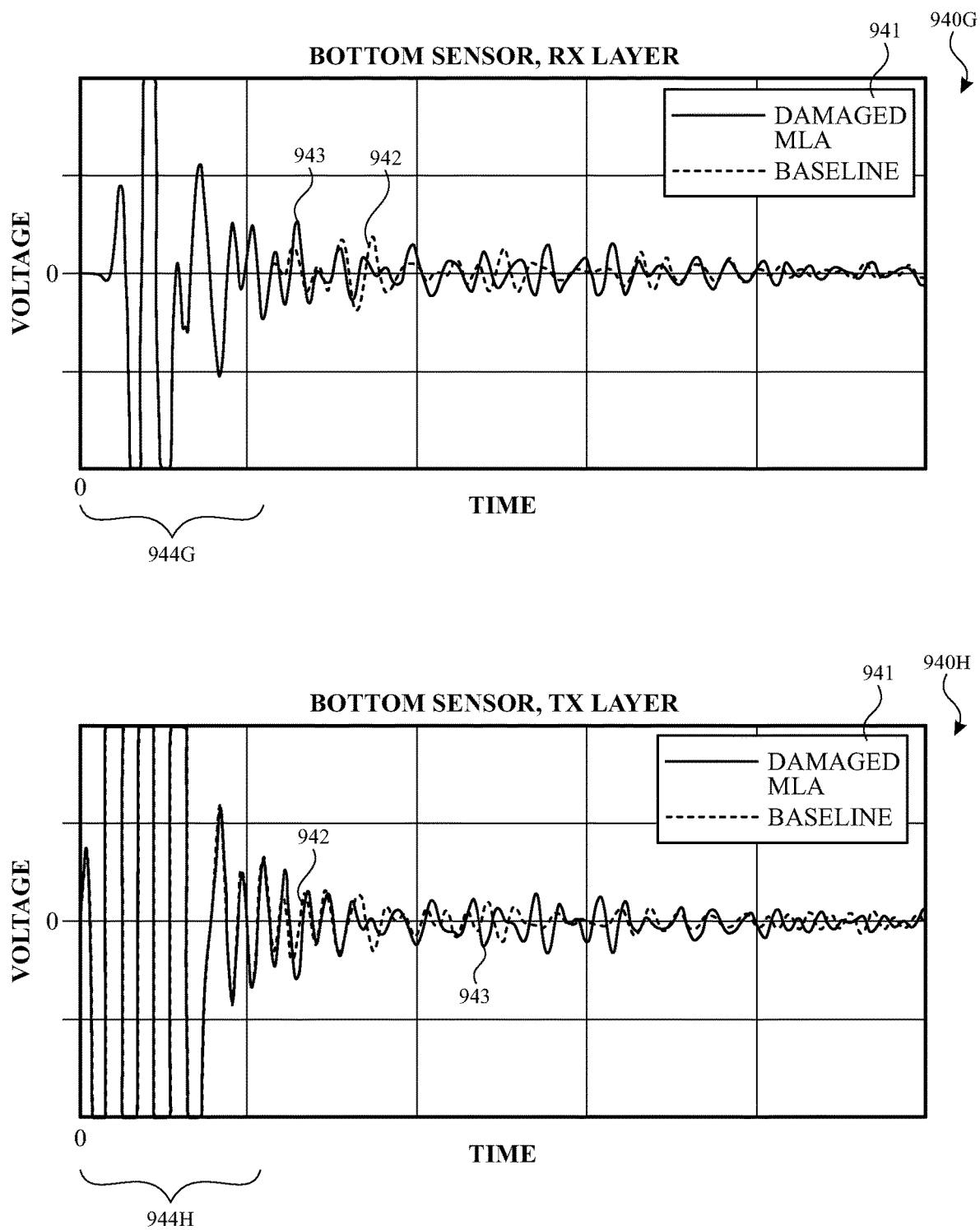
Figure 9E:
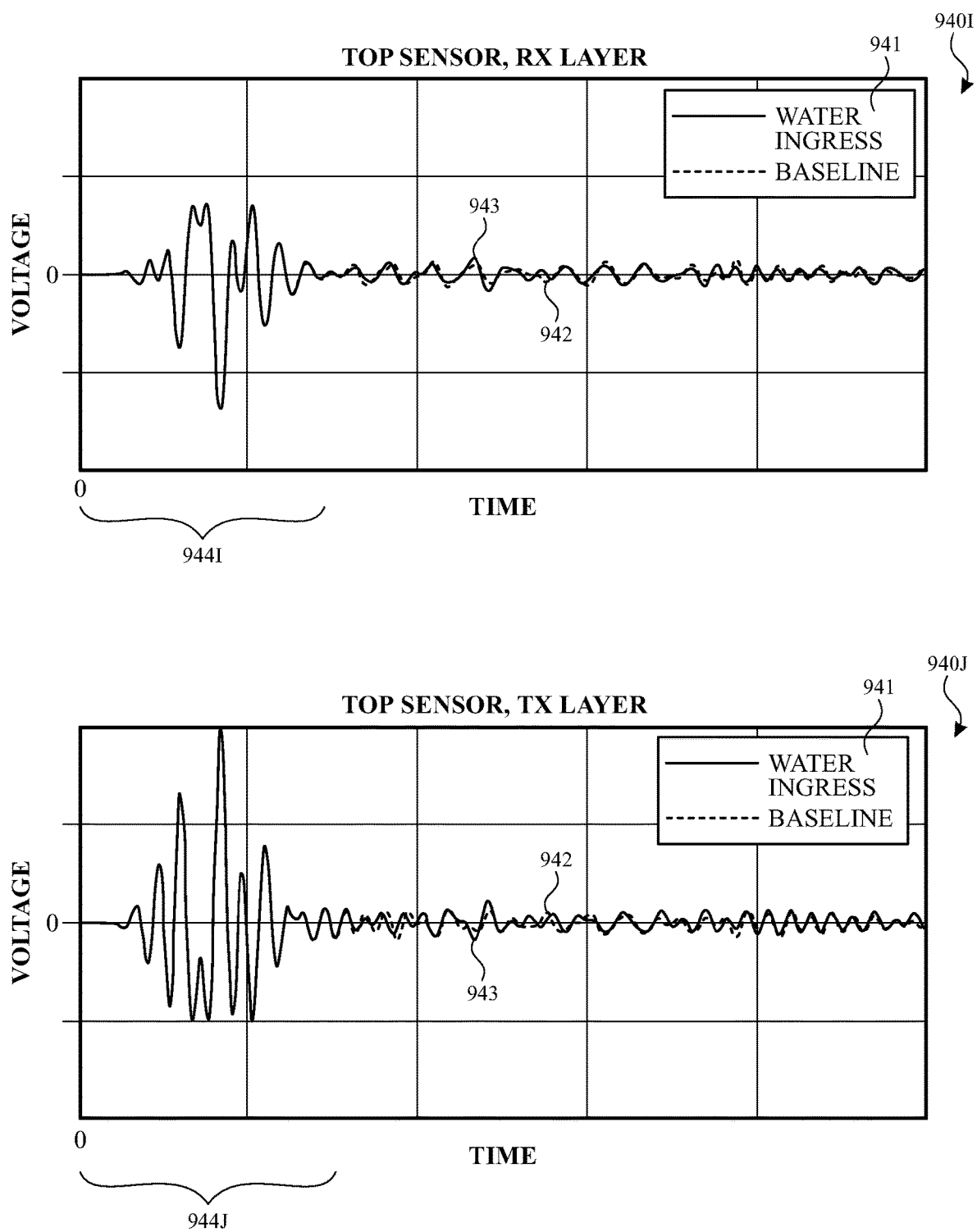
Figure 9F:
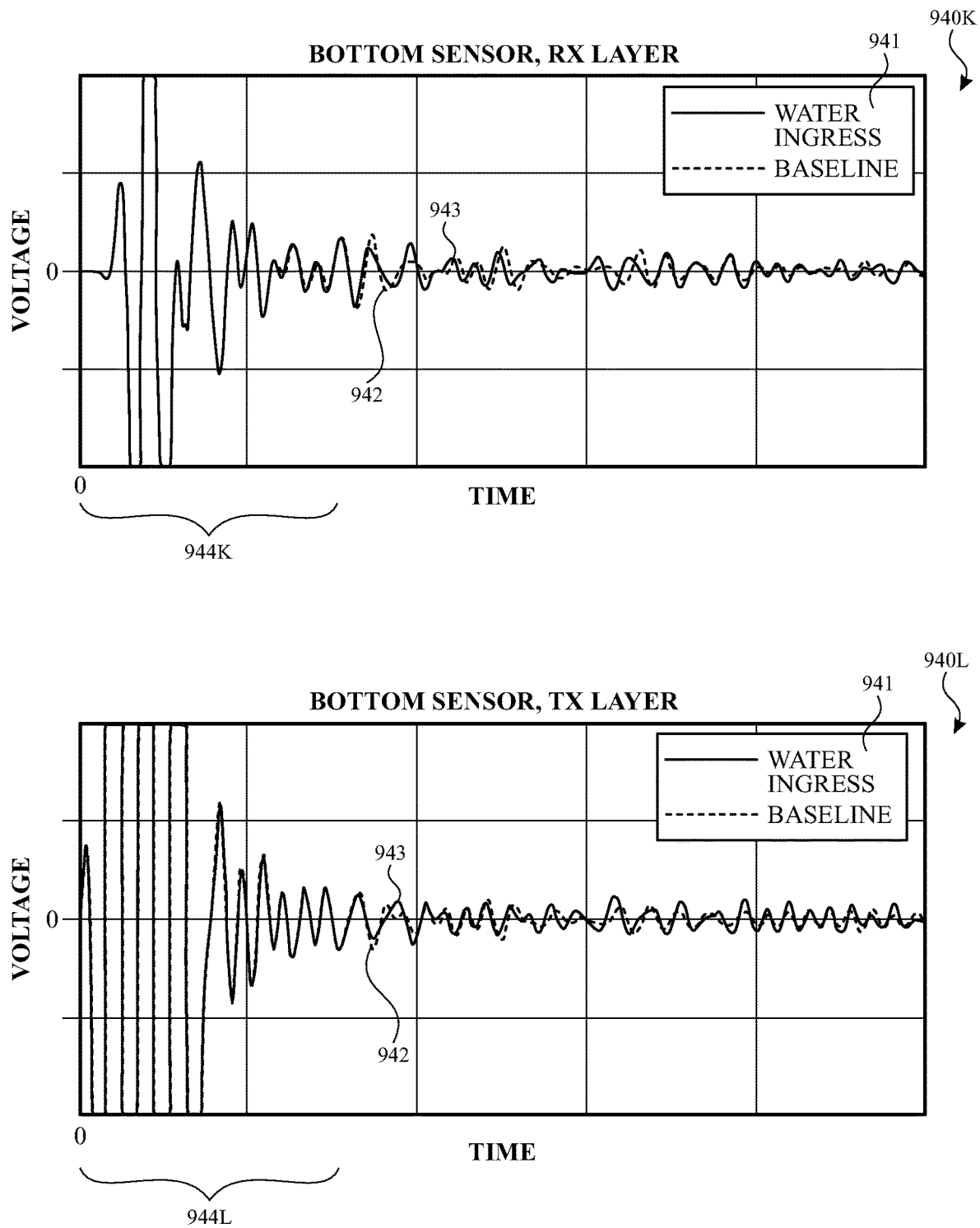

FIGS. 9C-9D illustrate example signal diagrams 940E-940H simulating a damaged micro lens array impurity detected according to the disclosed acoustic integrity detection method. FIGS. 9E-9F illustrate example signal diagrams 940I-940L simulating a water ingression impurity detected according to the disclosed acoustic integrity detection method. In a similar manner as described with respect to FIGS. 9A-9B, the bottom sensor in the transmit configuration can generate a stimulus signal and signal diagrams 940E-940L illustrate reflection signals 943 and baseline signals 942 for the top and bottom sensors in the receive and transmit configurations.

For initial periods 944E-944L (which may be of different durations) in signal diagrams 940E-940L, the baseline signal 942 and the reflection signal 943 may be identical or substantially identical, and then the reflection signal 943 may depart from the baseline signal 942. Such an observed change between the reflection signal 943 and the baseline signal 942 can be used to detect the presence and/or location of the defect, in a similar manner as described with respect to FIGS. 9A-9B. For example, a correlation or a magnitude squared of the difference between the reflection signal and the baseline signal (e.g., an energy measure) can be used to detect a deviation from the baseline. A threshold departure from the baseline may indicate the presence of a defect generally.

In some examples, different defects can be differentiated based on the amount and/or manner of the deviation. For example, as illustrated in FIGS. 9E-9F, a water ingression impurity simulation shows that the baseline and reflection signals are more highly correlated, for example, compared with the correlation of a lens impurity and/or a delamination impurity. Likewise, as illustrated in FIGS. 9C-9D, an MLA impurity simulation shows that the baseline and reflection signals are more highly correlated, for example, compared with the correlation of a delamination impurity. As a result, one or more different thresholds can be empirically determined and used to classify the impurity into different categories. Additionally or alternatively, the different defects can be differentiated based on location in the stack up using time of flight differences. For example, windows of interest corresponding to different layers in the stack up can be defined and analyzed to detect whether a deviation occurs within the window of interest corresponding to a delamination in that location, a lens defect in the location of the MLA, or a water ingress at a location between the MLA and light emitters.

Although FIGS. 9A-9F illustrate simulations in which the bottom sensor is stimulated, it should be understood that another sensor can instead be stimulated (e.g., the top sensor). In some examples, detection of different defects/impurities can be based on stimulation of different sensors. For example, a bottom sensor may be stimulated to detect delamination(s) in the bottom half of the stack up and a top sensor may be stimulated to detect delamination(s) in the top half of the stack up (e.g., above the substrate).

In some examples, as discussed above, the position of the impurity can be determined. In some examples, damage to one or more specific lenses, delamination of a layer over one or more specific lenses and/or water ingression over one or more specific lenses can be detected based on the position. In some such examples, these localized impurities can be repaired. In some such examples, these localized impurities can be used to disable some of the light emitters that have a light path through one of these localized impurities, whereas others of the light emitters can continue to operate or remain enabled. In some examples, all of the light emitters can be disabled irrespective of location of the defect.

As mentioned with reference to FIG. 2, the frequency of the ultrasonic acoustic wave generated by the transducers (e.g., 204 in FIG. 2) may be high (e.g., greater than 100 kHz) and may be selectable from a frequency range of 20 kHz to 800 kHz (or another range of frequencies), for example. Operating the transducers at high frequencies may help ensure that the one or more impurities or discontinuities that may be present in or on a respective optical component or in other layers in the stack up can be reliably detected and evaluated over short distances (e.g., material thicknesses of less than or equal to about 300 μm) and independently of other potential factors, such as changes in temperature. Alternatively, the use of low frequencies, for example, may result in reflections with reduced resolution (compared with high frequency stimulation), which may enable detection of an impurity or discontinuity in general, but may make reliable detection and evaluation of one or more characteristics of the reflections more difficult (and thus less likely to determine impurity position, type, and/or severity).

As described with respect to FIG. 3B, detection of an impurity may determine whether or not light may be emitted within a light illumination system (e.g., from light emitters 527 in FIG. 5). As discussed above, in some examples, the detection of an impurity may prevent light from being emitted (335 in FIG. 3B), while no detection of an impurity may enable light to be emitted (330 in FIG. 3B). As described, this determination can be made irrespective of specifics of the impurity (i.e., location, type, and severity). In some examples, however, even when an impurity is detected, light emission may still be enabled, which can be based on specifics of the optical integrity, as outlined above. For example, detection of one or more severe impurities, such as smashed or missing lenses or delamination of the lens array from the display, may indicate that light emission by the one or more light emitters would be optically hindered beyond acceptable levels. However, detection of one or more considerably less severe impurities, such as a minor scratch or near-negligible water ingress, may indicate that light emission is still possible without considerable hindrance to device operation, for example. Accordingly, the acoustic integrity detection method may be configured to enable light emission from the one or more light emitters based on the determination that a respective impurity, as determined by its severity (and/or location and/or type), would not compromise or significantly affect operation of the device.

For example, referring back to FIG. 2, host processor 214 may be configured to receive and process the signal data (e.g., the full reflection data can be transferred to the host processor from the transducers and/or acoustic optical integrity detection circuit 206) corresponding to the one or more changes in the reflected ultrasonic waves received by the one or more ultrasonic transducers. As such, the host processor 214 may be configured to determine a location, type, and/or severity of one or more impurities to thus make a determination of whether to enable light emission, as mentioned above. Additionally, in some examples, an optical power of the light emitted (e.g., laser light) may be reduced, as needed, to compensate for optical power that may be lost due to the impurity or discontinuity. In some examples, the host processor can provide control signal to the optical system to enable or disable light emission and/or to modify light emission. In some examples, as described herein, the host processor can provide a single bit message or flag to enable or disable the optical driver (e.g., a logic low or logic high). In some examples, the host processor can provide multiple bits to control different optical drivers separately and/or to control parameters (e.g., intensity) of the light emission. In some examples, the control signals from the host processor can be provided to the optical drivers via the acoustic optical integrity detection circuit 206.

Although described herein as the host processor being configured to process the signal data and provide control signals, in some examples, some or all of these functions can be provided by acoustic optical integrity detection circuit 206. In some examples, acoustic optical integrity detection circuit 206 can process the signal data to determine the location, type and/or severity of the impurities, and the host processor can generate control signals based on the location, type and/or severity of the impurities. In some examples, acoustic optical integrity detection circuit 206 can use the location, type and/or severity of the impurities to generate the control signal(s). In some examples, the acoustic optical integrity detection circuit 206 can provide the location, type and/or severity of the impurities to a processor or sub-processor that can be configured to control light emission.

In some examples, the disclosed acoustic integrity detection system and method may be additionally or alternatively configured to monitor the optical properties of light being emitted from the one or more light emitters. As an example, as light (e.g., laser light) propagates through the lenses of the MLA, through the one or more transducers, and through the display layers, the piezoelectric layers (of the ultrasonic sensing layer(s)) of the one or more transducers may become heated (due to material properties of the piezoelectric layer (e.g., pyroelectric properties of ZnO)). As the piezoelectric layers become heated, the piezoelectric layers may each generate a voltage proportional to a temperature of the respective layer. As such, the generated voltages can be (continuously) measured to monitor the temperatures of the piezoelectric layers, such that the light intensity of the light propagating through the lenses of the MLA can be evaluated. Evaluation of the light intensity of the laser light, for example, may thus enable the monitoring and evaluation of the optical power being transmitted/outputted from the one or more light emitters.

Thus, as described herein, one advantage of the disclosed acoustic integrity detection system and method is that impurities or discontinuities of geometric optical components of an optical system may be reliably detected and evaluated, which may enable correction, replacement and/or repair of the geometric optical components. One advantage of the disclosed acoustic integrity detection system and method is that impurities or discontinuities of optical components of an optical system may be effectively and reliably detected, which may enable control of an illumination system for safe and efficient light emission within a device. One advantage of the disclosed acoustic integrity detection system and method is that an illumination system having geometric optics (e.g., non-flat) such as a micro lens array is provided with a fail-safe, which may enable higher optical power emission and therefore greater device performance. One advantage of the disclosed acoustic integrity detection system and method is that a device may be provided with a high power illumination system at a lower cost, due to the low-cost and high performance output of geometric optics and the integration of a fail-safe for the geometric optics, which may help prevent instances of optical power loss. One advantage of the disclosed acoustic integrity detection system and method is that, because geometric optics of a device may be provided with a reliable acoustic integrity detection system, product compliance and thus user safety may be considerably improved in the field.

Therefore, according to the above, some examples of the disclosure are directed to an electronic device. The electronic device can comprise: a display; a lens array including one or more lenses; and one or more ultrasonic transducers coupled between the lens array and the display. The one or more ultrasonic transducers can be configured to generate one or more ultrasonic waves that propagate to the lens array and to receive one or more reflections of the ultrasonic waves from the lens array.

Additionally or alternatively, in some examples, the electronic device can further comprise a processor in communication with the one or more ultrasonic transducers. The processor can be configured to: determine an integrity of an optical system including the lens array using the one or more reflections of the ultrasonic waves.

Additionally or alternatively, in some examples, determining the integrity of the optical system may comprise: detecting one or more characteristics of the one or more reflections of the ultrasonic waves; and comparing the one or more characteristics of the one or more reflections to one or more predefined thresholds.

Additionally or alternatively, in some examples, the one or more characteristics of the one or more reflections may include a peak, a trough, a wavelength, an amplitude, or a period.

Additionally or alternatively, in some examples, the electronic device may further comprise: one or more optical emitters disposed below the lens array. The one or more optical emitters can be configured to emit light. The light emitted by the one or more optical emitters can be configured to propagate through the one or more lenses of the lens array, through the one or more ultrasonic transducers coupled to the lens array, and/or through the display.

Additionally or alternatively, in some examples, the one or more optical emitters may comprise one or more lasers.

Additionally or alternatively, in some examples, the electronic device may further comprise: a processor coupled to the one or more transducers. The processor can be configured to: in accordance with a determination the one or more reflections satisfy one or more integrity criteria, enable the one or more optical emitters to emit light, and in accordance with a determination that the one or more reflections fail to satisfy the one or more integrity criteria, disable the one or more optical emitters to forgo emitting light. Additionally or alternatively, in some examples, enabling the one or more optical emitters to emit light can include generating a first control signal (e.g., from the host processor or acoustic optical integrity detection circuitry) and transmitting the first control signal to a driver configured to drive the one or more optical emitters. Additionally or alternatively, in some examples, disabling the one or more optical emitters to forgo emitting light includes generating a second control signal (e.g., from the host processor or acoustic optical integrity detection circuitry), different than the first control signal (e.g., on a separate line or lines or using a different logic level or different bits on a shared line or lines), and transmitting the second control signal to the driver.

Additionally or alternatively, in some examples, the one or more lenses of the lens array may comprise glass or epoxy.

Additionally or alternatively, in some examples, the one or more transducers may comprise: a first piezoelectric layer; a first electrode layer disposed on one side of the first piezoelectric layer; and a second electrode layer disposed on a second side of the first piezoelectric layer, opposite the first side of the first piezoelectric layer.

Additionally or alternatively, in some examples, the one or more transducers may comprise: a second piezoelectric layer; and a third electrode layer. The second electrode layer can be disposed on a first side of the second piezoelectric layer and the third electrode layer can be disposed on a second side of the second piezoelectric layer, opposite the first side of the second piezoelectric layer. The second electrode layer can be configured as a ground electrode.

Additionally or alternatively, in some examples, the electronic device may further comprise: a first adhesive layer between the display and the one or more transducers; and a second adhesive between the one or more transducers and the lens array.

Additionally or alternatively, in some examples, the electronic device may further comprise a substrate disposed between the lens array and the one or more transducers. The one or more transducers can be formed on the substrate.

Some examples of the disclosure are directed to a method of optical integrity detection. The method can comprise: at an electronic device comprising a display, a lens array including one or more lenses, and one or more ultrasonic transducers coupled between the lens array and the display: generating one or more ultrasonic waves that propagate from the one or more transducers to the lens array; receiving one or more reflections of the ultrasonic waves from the lens array; and determining an integrity of an optical system including the lens array using the one or more reflections of the ultrasonic waves.

Additionally or alternatively, in some examples, determining the integrity of the optical system may comprise: detecting one or more characteristics of the one or more reflections of the ultrasonic waves; and comparing the one or more characteristics of the one or more reflections to one or more predefined thresholds.

Additionally or alternatively, in some examples, the one or more characteristics of the one or more reflections may include a peak, a trough, a wavelength, an amplitude, or a period.

Additionally or alternatively, in some examples, the electronic device may further comprise: one or more optical emitters disposed below the lens array. The one or more optical emitters can be configured to emit light. The light emitted by the one or more optical emitters can be configured to propagate through the one or more lenses of the lens array, through the one or more ultrasonic transducers coupled to the lens array, and/or through the display.

Additionally or alternatively, in some examples, the method may further comprise: in accordance with a determination the one or more reflections satisfy one or more integrity criteria, enabling the one or more optical emitters to emit light; and in accordance with a determination that the one or more reflections fail to satisfy the one or more integrity criteria, disabling the one or more optical emitters to forgo emitting light.

Additionally or alternatively, in some examples, the one or more transducers of the electronic device may comprise: a first piezoelectric layer; a first electrode layer disposed on one side of the first piezoelectric layer; and a second electrode layer disposed on a second side of the first piezoelectric layer, opposite the first side of the first piezoelectric layer.

Additionally or alternatively, in some examples, the one or more transducers of the electronic device may comprise: a second piezoelectric layer; and a third electrode layer. The second electrode layer can be disposed on a first side of the second piezoelectric layer and the third electrode layer can be disposed on a second side of the second piezoelectric layer, opposite the first side of the second piezoelectric layer. The second electrode layer can be configured as a ground electrode.

Some examples of the disclosure are directed to a non-transitory computer readable storage medium. The non-transitory computer readable storage medium can store instructions, which when executed by an electronic device comprising a display, one or more optical emitters, a lens array including one or more lenses, one or more ultrasonic transducers coupled between the lens array and the display, and processing circuitry, can cause the electronic device to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An electronic device comprising:
   a display;
   a lens array;
   one or more ultrasonic transducers coupled between the lens array and the display; and
   detection circuitry, wherein the detection circuitry is configured to stimulate the one or more ultrasonic transducers to generate one or more ultrasonic waves that propagate to the lens array and the detection circuitry is configured to receive one or more reflections of the one or more ultrasonic waves from the lens array.

2. The electronic device of claim 1, further comprising:
   a processor in communication with the one or more ultrasonic transducers, the processor configured to:

determine an integrity of an optical system including the lens array using the one or more reflections of the one or more ultrasonic waves.

3. The electronic device of claim 2, wherein determining the integrity of the optical system comprises:
detecting one or more characteristics of the one or more reflections of the one or more ultrasonic waves; and
comparing the one or more characteristics of the one or more reflections to one or more predefined thresholds.

4. The electronic device of claim 3, wherein the one or more characteristics of the one or more reflections include a peak, a trough, a wavelength, an amplitude, or a period.

5. The electronic device of claim 2, further comprising:
one or more optical emitters disposed below the lens array, the one or more optical emitters configured to emit light;
wherein the light emitted by the one or more optical emitters is configured to propagate through one or more lenses of the lens array, through the one or more ultrasonic transducers coupled to the lens array, and through the display.

6. The electronic device of claim 5, wherein the one or more optical emitters comprises one or more lasers.

7. The electronic device of claim 5, further comprising:
a processor coupled to the one or more ultrasonic transducers and configured to:
in accordance with a determination the one or more reflections satisfy one or more integrity criteria, enable the one or more optical emitters to emit light; and
in accordance with a determination that the one or more reflections fail to satisfy the one or more integrity criteria, disable the one or more optical emitters to forgo emitting light.

8. The electronic device of claim 1, wherein one or more lenses of the lens array comprise glass or epoxy.

9. The electronic device of claim 1, wherein the one or more ultrasonic transducers comprise:
a first piezoelectric layer;
a first electrode layer disposed on a first side of the first piezoelectric layer; and
a second electrode layer disposed on a second side of the first piezoelectric layer, opposite the first side of the first piezoelectric layer.

10. The electronic device of claim 9, wherein the one or more ultrasonic transducers comprise:
a second piezoelectric layer; and
a third electrode layer, wherein the second electrode layer is disposed on a first side of the second piezoelectric layer and the third electrode layer is disposed on a second side of the second piezoelectric layer, opposite the first side of the second piezoelectric layer, and wherein the second electrode layer is configured as a ground electrode.

11. The electronic device of claim 1, further comprising:
a first adhesive layer between the display and the one or more ultrasonic transducers; and
a second adhesive between the one or more ultrasonic transducers and the lens array.

12. The electronic device of claim 1, further comprising:
a substrate disposed between the lens array and the one or more ultrasonic transducers, wherein the one or more ultrasonic transducers are formed on the substrate.

13. A method comprising:
at an electronic device comprising a display, a lens array, and one or more ultrasonic transducers coupled between the lens array and the display:
generating one or more ultrasonic waves that propagate from the one or more ultrasonic transducers to the lens array;
receiving one or more reflections of the one or more ultrasonic waves from the lens array; and
determining an integrity of an optical system including the lens array using the one or more reflections of the one or more ultrasonic waves.

14. The method of claim 13, wherein determining the integrity of the optical system comprises:
detecting one or more characteristics of the one or more reflections of the one or more ultrasonic waves; and
comparing the one or more characteristics of the one or more reflections to one or more predefined thresholds.

15. The method of claim 14, wherein the one or more characteristics of the one or more reflections include a peak, a trough, a wavelength, an amplitude, or a period.

16. The method of claim 13, wherein the electronic device further comprises:
one or more optical emitters disposed below the lens array, the one or more optical emitters configured to emit light;
wherein the light emitted by the one or more optical emitters is configured to propagate through one or more lenses of the lens array, through the one or more ultrasonic transducers coupled to the lens array, and through the display.

17. The method of claim 16, further comprising:
in accordance with a determination the one or more reflections satisfy one or more integrity criteria, enabling the one or more optical emitters to emit light; and
in accordance with a determination that the one or more reflections fail to satisfy the one or more integrity criteria, disabling the one or more optical emitters to forgo emitting light.

18. The method of claim 13, wherein the one or more ultrasonic transducers of the electronic device comprise:
a first piezoelectric layer;
a first electrode layer disposed on a first side of the first piezoelectric layer; and
a second electrode layer disposed on a second side of the first piezoelectric layer, opposite the first side of the first piezoelectric layer.

19. The method of claim 18, wherein the one or more ultrasonic transducers of the electronic device comprise:
a second piezoelectric layer; and
a third electrode layer, wherein the second electrode layer is disposed on a first side of the second piezoelectric layer and the third electrode layer is disposed on a second side of the second piezoelectric layer, opposite the first side of the second piezoelectric layer, and wherein the second electrode layer is configured as a ground electrode.

20. A non-transitory computer readable storage medium storing instructions, which when executed by an electronic device comprising a display, one or more optical emitters, a lens array, one or more ultrasonic transducers coupled between the lens array and the display, and processing circuitry, causes the electronic device to:
generate one or more ultrasonic waves that propagate from the one or more ultrasonic transducers to the lens array;
receive one or more reflections of the one or more ultrasonic waves from the lens array;

in accordance with a determination the one or more reflections satisfy one or more integrity criteria, enable the one or more optical emitters to emit light; and in accordance with a determination that the one or more reflections fail to satisfy the one or more integrity criteria, disable the one or more optical emitters to forgo emitting light.

\* \* \* \* \*